United States Patent
Du et al.

(10) Patent No.: US 11,868,583 B2
(45) Date of Patent: Jan. 9, 2024

(54) TANGIBLE SIX-DEGREE-OF-FREEDOM INTERFACES FOR AUGMENTED REALITY

(71) Applicant: Google LLC, Mountain View, CA (US)

(72) Inventors: Ruofei Du, San Francisco, CA (US); Alex Olwal, Santa Cruz, CA (US); Mathieu Simon Le Goc, San Francisco, CA (US); David Kim, Zug (CH); Danhang Tang, Los Angeles, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/656,818

(22) Filed: Mar. 28, 2022

(65) Prior Publication Data
US 2023/0305672 A1    Sep. 28, 2023

(51) Int. Cl.
*G06F 3/04815* (2022.01)
*G02B 27/01* (2006.01)
*G10L 15/22* (2006.01)

(52) U.S. Cl.
CPC ..... *G06F 3/04815* (2013.01); *G02B 27/0172* (2013.01); *G02B 27/0176* (2013.01); *G10L 15/22* (2013.01); *G02B 2027/0178* (2013.01); *G10L 2015/223* (2013.01)

(58) Field of Classification Search
CPC .......... G06F 3/011; G06F 3/012; G06F 3/013; G06F 3/04815; G06F 3/017; G06F 1/1694; G06F 3/04845; G06F 3/016; G06F 3/147; G06F 3/04842; G06F 3/0346; G06F 3/0482; G06F 3/0483; G06F 16/5866; G06F 3/167; G06F 40/44; G06F 21/36; G06F 3/0304; G06F 3/0683; G06F 11/3013; G06F 11/3058; G06F 12/0253; G06F 16/43; G06F 21/31; G06F 21/33; G06F 1/163; G06F 30/00; G06F 30/20; G06F 2203/011;
(Continued)

(56) References Cited

U.S. PATENT DOCUMENTS

2013/0297460 A1* 11/2013 Spivack ............ G06Q 30/0643
   705/27.2
2015/0356774 A1  12/2015 Gal et al.
2016/0026253 A1   1/2016 Bradski et al.
(Continued)

FOREIGN PATENT DOCUMENTS

EP        2560145 A2    2/2013

OTHER PUBLICATIONS

Billinghurst, et al., "Targeted Augmented Reality", retrieved from http://icat.vrsj.org/papers/2004/Tutorial/T1-1.pdf, 2008, 11 pages.
(Continued)

*Primary Examiner* — Rayeez R Chowdhury
(74) *Attorney, Agent, or Firm* — Brake Hughes Bellermann LLP

(57) ABSTRACT

Systems and methods are provided in which physical objects in the ambient environment can function as user interface implements in an augmented reality environment. A physical object detected within a field of view of a camera of a computing device may be designated as a user interface implement in response to a user command. User interfaces may be attached to the designated physical object, to provide a tangible user interface implement for user interaction with the augmented reality environment.

20 Claims, 28 Drawing Sheets

(58) Field of Classification Search
CPC .... G06F 3/015; G06F 3/0481; G06F 3/04817; G06F 3/01; G06F 21/32; G06F 21/46
See application file for complete search history.

(56) References Cited

U.S. PATENT DOCUMENTS

| | | | |
|---|---|---|---|
| 2017/0372499 A1* | 12/2017 | Lalonde | G06T 11/60 |
| 2018/0045963 A1* | 2/2018 | Hoover | H04N 13/156 |
| 2018/0268607 A1* | 9/2018 | Mullins | G06F 1/1686 |
| 2018/0315248 A1* | 11/2018 | Bastov | G06T 19/20 |
| 2019/0295273 A1* | 9/2019 | Price | H04N 13/344 |
| 2020/0201514 A1 | 6/2020 | Murphy et al. | |
| 2021/0081050 A1* | 3/2021 | Zhou | G06F 3/0304 |
| 2021/0134066 A1* | 5/2021 | Koidahl | G06V 20/20 |
| 2021/0182639 A1 | 6/2021 | Brent et al. | |
| 2021/0201581 A1 | 7/2021 | Xie et al. | |
| 2021/0304451 A1 | 9/2021 | Fortier et al. | |

OTHER PUBLICATIONS

International Search Report and Written Opinion for PCT Application No. PCT/US2022/080664, dated Apr. 4, 2023, 15 pages.

* cited by examiner

… (1)

TANGIBLE SIX-DEGREE-OF-FREEDOM INTERFACES FOR AUGMENTED REALITY

FIELD

This relates, generally, to user interfaces for use in augmented reality, and in particular, to user interfaces based on physical objects for use in an augmented reality environment.

BACKGROUND

Augmented reality (AR) systems, or mixed reality (MR) systems, or virtual reality (VR) systems, may provide for user interaction with content output by the system in a variety of different manners. In some situations, virtual user interfaces and/or controls generated by these types of systems may be difficult for the user to interact with, and/or may lack the ability to receive and detect precise user inputs. For example, a user experiencing and interacting with virtual content in an AR/MR/VR environment through a head mounted device including a display, such as smart glasses, may find the user interface capability of such a head mounted device to be somewhat constrained. The use of physical, tangible objects as a vehicle for user interfaces in an AR/MR/VR environment to facilitate user interaction with virtual content may enhance the utility and functionality of the AR/MR/VR device, and may enhance the user experience.

SUMMARY

In one general aspect, a computer-implemented method includes capturing, by a camera of a computing device, an image of an ambient environment; identifying, in the image, a physical object in the ambient environment; detecting, by the computing device, a command to associate a user interface with the physical object identified in the image; designating the physical object as a user interface implement in response to the command; triggering display, by a display device of the computing device, the user interface as a virtual object; mapping at least one feature of the physical object detected in the image to at least one feature of the user interface; detecting a user manipulation of the physical object; and in response to the user manipulation of the physical object, triggering a change in a control algorithm of the user interface corresponding to the user manipulation of the physical object.

In some implementations, triggering the change in the control algorithm of the user interface includes controlling operation of an external electronic device in communication with the computing device in response to the user manipulation of the physical object. In some implementations, triggering the change in the control algorithm of the user interface in response to the user manipulation of the physical object includes changing a functionality of the user interface in response to the user manipulation of the physical object. In some implementations, triggering the change in the control algorithm of the user interface in response to the user manipulation of the physical object includes tracking, by a hand tracking module accessible to the computing device, hand movement in a field of view of the camera of the computing device; detecting, based on the tracking, a hand movement corresponding to a user input into the user interface; and executing an action in response to the input into the user interface.

In some implementations, triggering the change in the control algorithm of the user interface in response to the user manipulation of the physical object includes tracking, by a pose estimation module accessible to the computing device, a position and an orientation of the physical object; detecting, based on the tracking, a change in at least one of the position or the orientation of the physical object; and adjusting at least one of a position or an orientation of the user interface in response to the change in the at least one of the position or the orientation of the physical object. In some implementations, detecting the command to associate the user interface with the physical object includes attaching the display of the user interface to the physical object based on the mapping of the at least one feature of the physical object to the at least one feature of the user interface; and adjusting the position and the orientation of the user interface in response to detected changes in the position and the orientation of the physical object such that the display of the user interface remains attached to the physical object. In some implementations, the computer-implemented method also includes adjusting at least one of an appearance of the user interface or a functionality of the user interface based on a distance between the computing device and the physical object.

In some implementations, detecting the command to associate the user interface with the physical object includes detecting, by an audio sensor of the computing device, an audible command; transcribing, by a transcription engine accessible to the computing device, the audible command into an executable command; and associating the user interface with the physical object in response to the executable command. In some implementations, identifying the physical object includes detecting visual patterns in the image; comparing the visual patterns detected in the image to visual patterns associated with images stored in a database accessible to the computing device; and identifying the physical object based on the comparing.

In some implementations, the computing device is a head mounted display device, and wherein capturing the image and identifying the physical object includes capturing, by the camera mounted on a frame portion of the head mounted display device, the image of the ambient environment; and identifying, in the image, the physical object held by a user within a field of view of the camera.

In some implementations, detecting the user manipulation of the physical object includes detecting a movement of the at least one feature of the physical object; detecting a movement of the at least one feature of the user interface corresponding to the movement of the at least one feature of the physical object; and triggering the change in the control algorithm of the user interface, including executing an action in response to the user manipulation of the physical object.

In another general aspect, a computing system includes a computing device, including a camera capturing images of an ambient environment outside of the computing device; a display device; at least one processing device; and a memory storing instructions that, when executed by the at least one processing device, cause the computing system to perform operations. The operations may include capturing, by the camera, an image of the ambient environment; identifying, in the image, a physical object in the ambient environment; detecting, by the computing device, a command to designate the physical object as a user interface implement; triggering display, by the display device, a user interface as a virtual object attached to the physical object; mapping at least one feature of the physical object detected in the image to at least one feature of the user interface; detecting a user manipulation of the physical object; and triggering a change in a control algorithm associated with the user interface in response to the user manipulation of the physical object.

In some implementations, triggering the change in the control algorithm associated with the user interface includes controlling operation of an external electronic device in communication with the computing device in response to the user manipulation of the physical object. In some implementations, executing the action includes changing a functionality of the user interface in response to user manipulation of the physical object. In some implementations, triggering the change in the control algorithm associated with the user interface includes tracking, by a hand tracking module accessible to the computing device, hand movement in a field of view of the camera of the computing device; detecting, based on the tracking, a hand movement corresponding to a user input into the user interface; and executing an action in response to the user input into the user interface.

In some implementations, triggering the change in the control algorithm associated with the user interface includes tracking, by a pose estimation module accessible to the computing device, a position and an orientation of the physical object; detecting, based on the tracking, a change in at least one of the position or the orientation of the physical object; and adjusting at least one of a position or an orientation of the user interface in response to the change in the at least one of the position or the orientation of the physical object. In some implementations, triggering the display of the user interface as the virtual object attached to the physical object includes adjusting at least one of a position or an orientation of the user interface in response to detected changes in a position or an orientation of the physical object such that the display of the user interface remains attached to the physical object as the physical object moves in response to user manipulation of the physical object.

In some implementations, triggering the change in the control algorithm associated with the user interface includes adjusting at least one of an appearance or a functionality of the user interface based on a distance between the computing device and the physical object. In some implementations, detecting the command to designate the physical object as the user interface implement includes detecting, by an audio sensor of the computing device, an audible command; transcribing, by a transcription engine accessible to the computing device, the audible command into an executable command; and designating the physical object as the user interface implement in response to the executable command. In some implementations, detecting the user manipulation of the physical object includes detecting a movement of the at least one feature of the physical object; detecting a movement of the at least one feature of the user interface corresponding to the movement of the at least one feature of the physical object; and triggering the change in the control algorithm of the user interface, including executing an action in response to the user manipulation of the physical object.

The details of one or more implementations are set forth in the accompanying drawings and the description below. Other features will be apparent from the description and drawings, and from the claims.

DETAILED DESCRIPTION

Figure 1A:
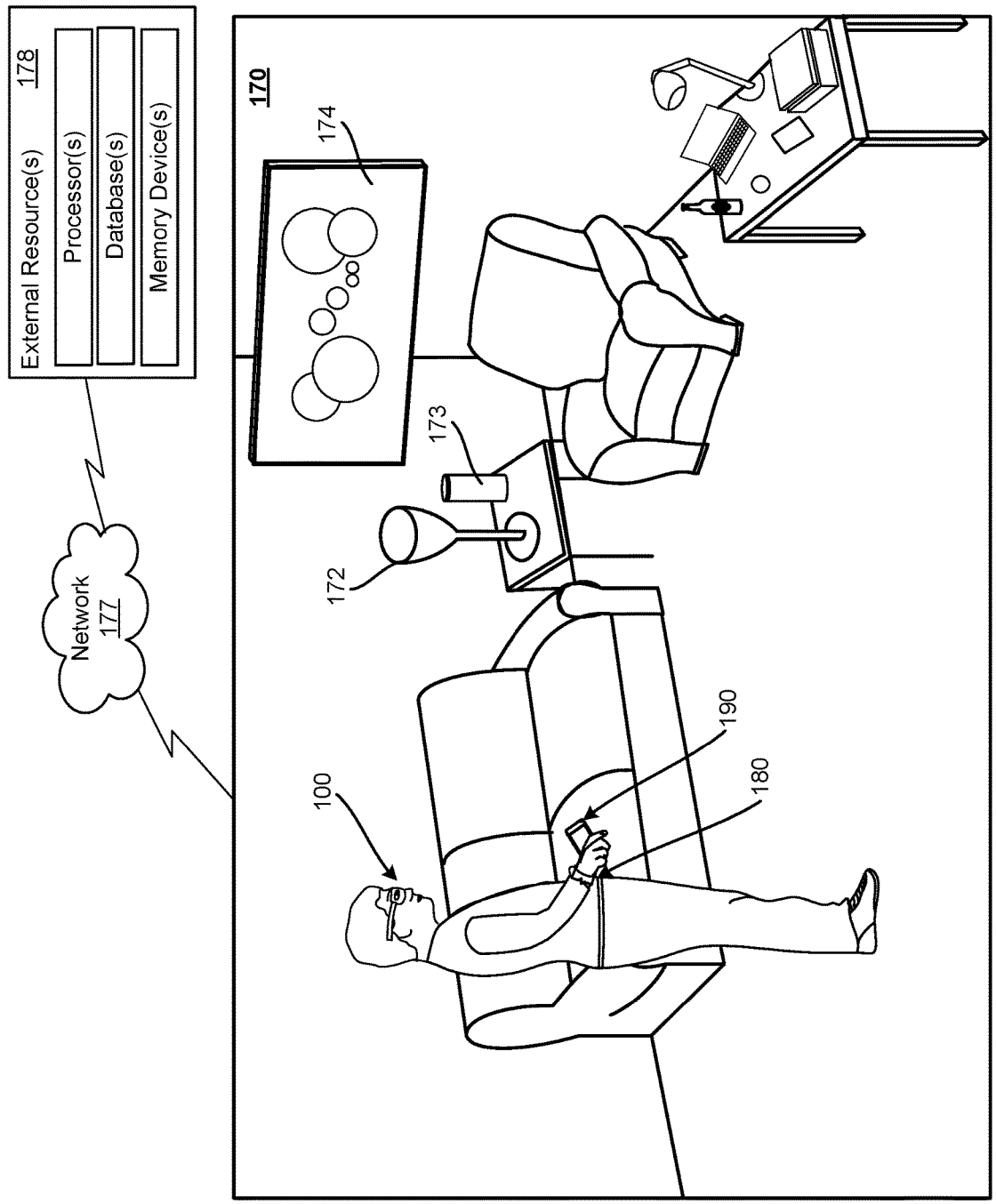
FIG. 1A is a third person view of a user in an ambient environment.

A user may experience and interact with content output by various different types of electronic devices having content output capabilities in an AR environment, or an MR environment, or a VR environment. In some examples, such electronic devices may include mobile computing devices such as smart phones, tablet computing devices, laptop computing devices and the like. In some examples, such electronic devices may include wearable devices having content output capabilities. Wearable devices may include, for example, head mounted electronic devices such as smart glasses, ear worn electronic devices such as ear buds or headphones, wrist worn electronic devices such as smart watches, and other such electronic devices. In some configurations, the user interface capabilities of these types of example wearable devices may be somewhat constrained based on, for example, physical size, available display area, and the like. Further, user interaction with content output by these types of wearable devices through, for example, gesture inputs, audio inputs and the like, when that content is not visible to and/or audible to others, may be uncomfortable for the user. In an example in which the wearable device includes interface devices and/or control devices for interacting with content, it may still be difficult for the user to interact with the content due to limitations of the interface/control devices.

A system and method, in accordance with implementations described herein, may enlist physical objects in the ambient environment to facilitate user interaction with content output by a computing device of the user. In some examples, the disclosed systems and methods may attach a user interface to a selected physical object in the ambient environment. In some examples, the disclosed systems and methods may appoint or designate a selected physical object in the ambient environment as an auxiliary input device. In some examples, the disclosed systems and methods may provide for the tracking of a selected physical object in the ambient environment to facilitate the use of the selected physical object as an auxiliary input device. In some examples, user manipulation of the physical object that has been designated as an auxiliary input device may trigger a change in the user interface and/or a change in one or more control algorithms associated with the user interface. In some examples, changes in the one or more control algorithms associated with the user interface may include changes in the appearance of the user interface. In some examples, changes in the one or more control algorithms associated with the user interface may include changes in user selectable user interface elements or icons of the user interface and/or a number and/or arrangement of user interface elements or icons included in the user interface. In some examples, changes in the one or more control algorithms associated with the user interface may include changes in one or more controllable devices in communication with the computing device. The opportunistic use of physical objects in the ambient environment to facilitate user interaction in an AR, or MR, or VR environment may expand the user's involvement in the AR/MR/VR environment, by providing an interactive may improve the precision of the input provided by the user, and may enhance the overall experience in the AR/MR/VR environment.

FIG. 1A is a third person view of a user in an ambient environment 170. Various example computing devices 100, 180, 190 are shown in FIG. 1A that can output content to be consumed by the user. The example computing devices include an example head mounted display (HMD) device 100 in the form of, for example, smart glasses, an example wrist worn computing device 180 in the form of, for example, a smart watch, and an example handheld computing device 190 in the form of, for example, a smart phone. The user may consume content output by one of the example computing devices 100, 180, 190, including, for example still and/or moving image content, audio content, and the like. The user may make use of the functionality of the computing device(s) 100, 180, 190 to interact with the content output by the computing device(s) 100, 180, 190. The user may interact with the content output by the computing device(s) 100, 180, 190 through, for example, manipulation of control devices of the computing device(s) 100, 180, 190, gesture inputs detected by the computing device(s) 100, 180, 190, audio inputs detected by the computing device(s) 100, 180, 190, and the like. In some examples, the functionality of the computing device(s) 100, 180, 190 may allow the user to interact with one or more connected, or controllable devices in the ambient environment 170 via the computing device(s) 100, 180, 190. The one or more connected, or controllable devices may be external to the computing device(s) 100, 180, 190, and in communication with the computing device(s) 100, 180, 190. Example connected and/or controllable devices in the ambient environment 170 shown in FIG. 1A include an example smart light/smart bulb 172, an example smart speaker 173, and an example smart TV 174, simply for purposes of discussion and illustration. The user may use the computing device(s) 100, 180, 190 to interact with other connected, or controllable devices not specifically shown in FIG. 1A. In some examples, the computing device(s) 100, 180, 190 may access a network 177 to communicate with the external connected, or controllable devices. In some examples, the HMD 100 may access and/or exchange information with external resources 178 via the network 177, receive content via the network 177 and the like.

Hereinafter, the HMD 100 will be used as an example electronic computing device that can output content to be consumed by the user, that can be used by the user to interact with other connected or controllable devices external to the HMD 100, and the like, simply for purposes of discussion and illustration. The principles to be described herein may be applied to other types of electronic computing devices that can output content for consumption by the user, and that can interact with other, external devices in communication with the electronic computing device.

Figure 1B:
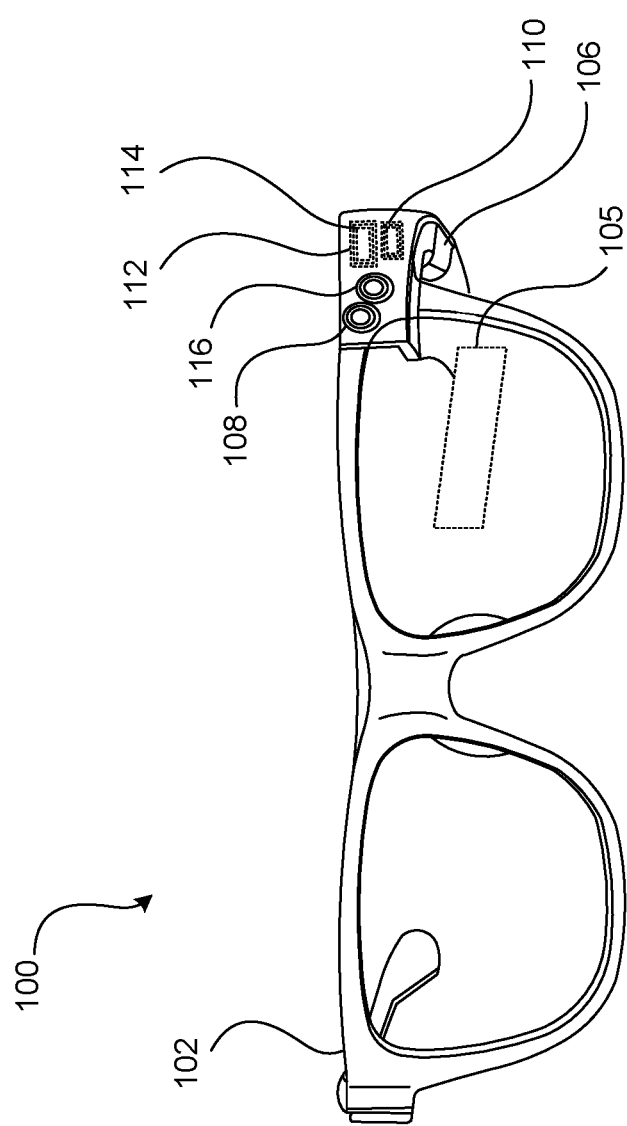
FIG. 1B is a front view of an example head mounted display device.
Figure 1C:
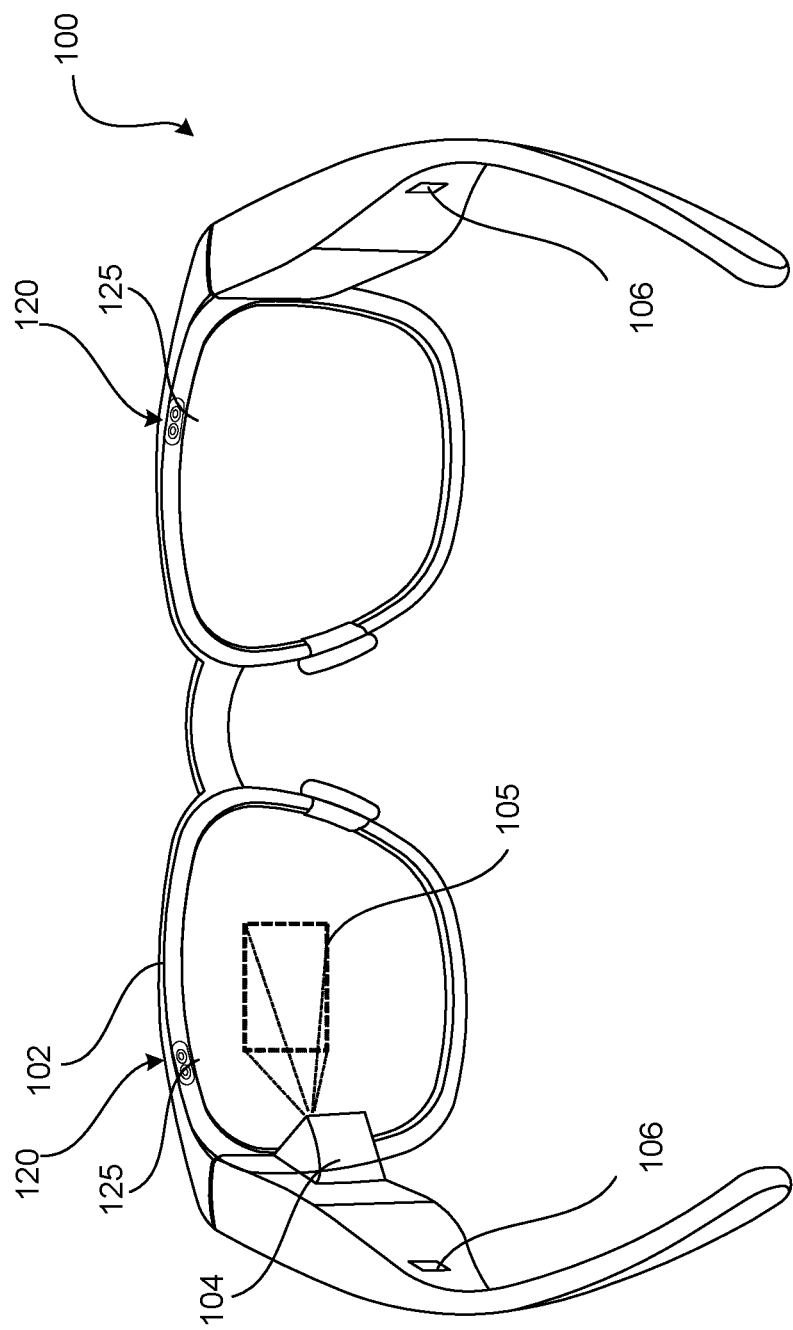
FIG. 1C is a rear view of the example head mounted display device, in accordance with implementations as described herein.

FIG. 1B is a front view, and FIG. 1C is a rear view, of the example computing device 100 in the form of the HMD 100 worn by the user in FIG. 1A. In the example shown in FIGS. 1B and 1C, the HMD 100 is configured as a pair of smart glasses, or augmented reality glasses, simply for purposes of discussion and illustration.

As shown in FIG. 1B, the example HMD 100 includes a frame 102. The frame 102 includes rim portions surrounding glass portion(s), or lenses, and arm portions coupled to the rim portions. In the example shown in FIGS. 1B and 1C, a display device 104 is coupled in the arm portion of the frame 102, configured to display content to the user within an eye box 105. The HMD 100 can also include an audio output device 106, an illumination device 108, a sensing system 110, a control system 112, at least one processor 114, and an outward facing image sensor 116, or camera 116. In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world next to digital images (e.g., user interface elements, virtual content, etc.) generated by the display device 104. In some implementations, waveguide optics may be used to depict content on the display device 104 of the HMD 100.

The audio output device 106 may include one or more speakers coupled to the frame 102. The sensing system 110 may include various sensing devices and the control system 112 may include various control system devices to facilitate operation of the HMD 100 including, for example, one or more processors 114 operably coupled to the components of the control system 112. In some implementations, the control system 112 may include a communication module providing for communication and exchange of information between the HMD 100 and other external devices.

In some implementations, the camera 116 may be an outward facing camera 116, or a world facing camera 116 that is capable of capturing still and/or moving images of external objects in the ambient environment within a field of view of the camera 116. In some implementations, the camera 116 may be a depth camera that can collect data related to distances of the external objects from the camera 116. In some implementations, the illumination device 108 may selectively operate, for example, with the camera 116, for detection of objects in the field of view of the camera 116.

In some implementations, the HMD 100 includes a gaze tracking device 120 including, for example, one or more sensors 125 for example, one or more image sensors 125. The gaze tracking device 120 may detect and track eye gaze direction and movement. Images captured by the sensor(s) 125 may be processed to detect and track gaze direction and movement, and to detect gaze fixation. In some implementations, the detected gaze may be processed as a user input to be translated into a corresponding interaction with external objects in the ambient environment 170 that are visible to the user through the HMD 100 and/or interaction with objects displayed to the user by the display device 104.

Figure 2:
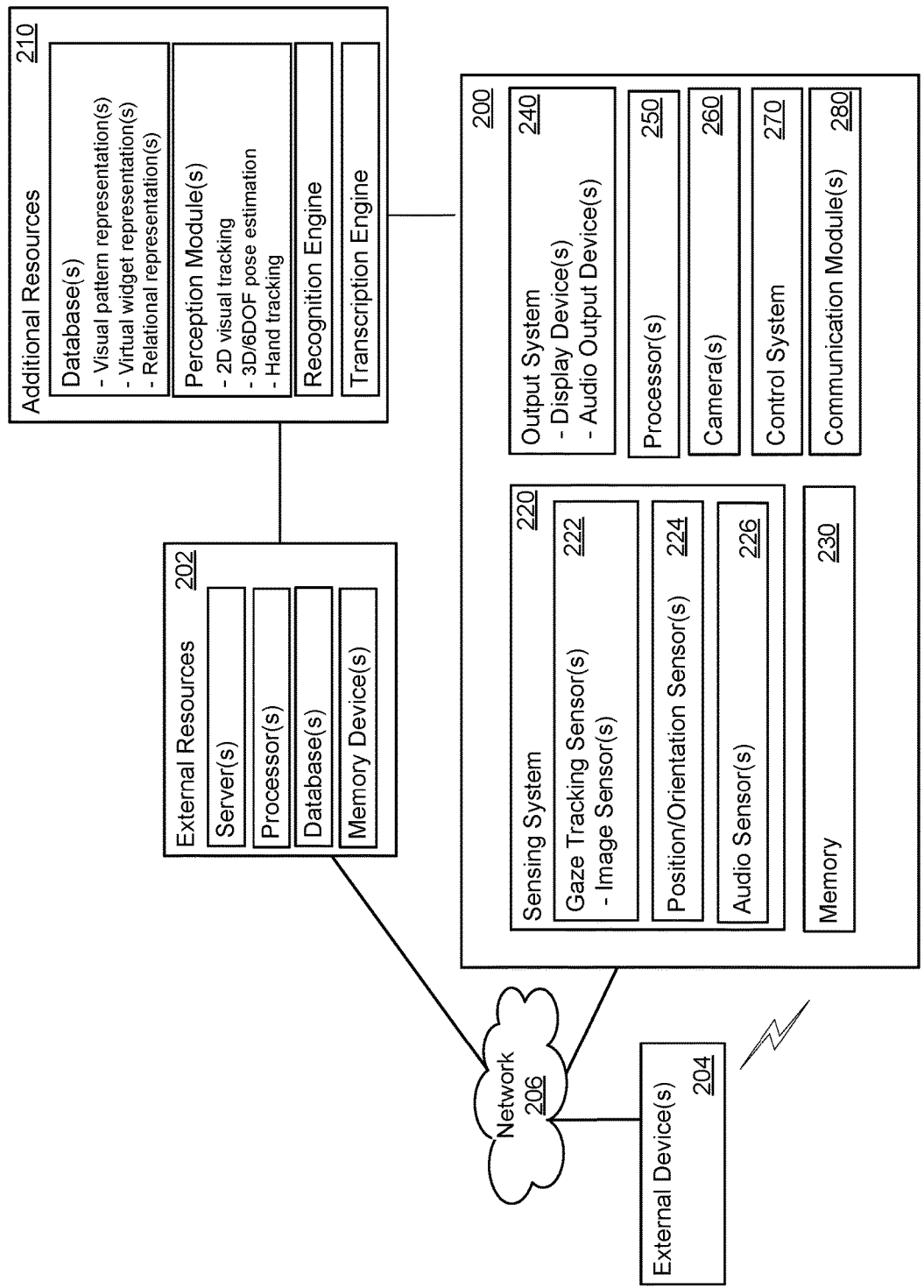
FIG. 2 is a block diagram of an example head mounted display device, in accordance with implementations as described herein.

FIG. 2 is a block diagram of an example system, according to implementations described throughout this disclosure. As shown in FIG. 2, in some implementations, the system includes one or more computing devices including at least one computing device 200 (such as, for example, the HMD 100 described above, and/or other electronic computing devices). The computing device 200 can communicate selectively via a network 206 to access external resources 202 such as, for example, server computer systems, processors, databases, memory storage, and the like. The computing device 200 can operate under the control of a control system 270. The computing device 200 can communicate with one or more external computing devices 204 (another wearable computing device, another mobile computing device, an external controllable device, and the like) either directly (via wired and/or wireless communication), or via the network 206. The computing device 200 can include a communication module 280 to facilitate external communication. In some implementations, the computing device 200 includes a sensing system 220 including various sensing system components including, for example one or more gaze tracking sensors 222 including, for example image sensors, one or more position/orientation sensor(s) 224 including for example, an inertial measurement unit, accelerometer, gyroscope, magnetometer and the like, and one or more audio sensors 226 that can detect audio input. The computing device 200 can include more, or fewer, sensing devices and/or combinations of sensing devices.

In some implementations, the computing device 200 may include an output system 240 including, for example, one or more display devices that can display still and/or moving image content and one or more audio output devices that can output audio content. In some implementations, the computing device 200 may include one or more camera(s) 260. The camera(s) 260 may be, for example, outward facing, or world facing cameras that can capture still and/or moving images of an environment outside of the computing device 200. The still and/or moving images may be displayed by the display device of the output system 240 and/or transmitted externally via the communication module 280 and the 206, and/or stored in a memory 230 of the computing device 200. The computing device 200 may include one or more processors 250, which may be formed in a substrate configured to execute one or more machine executable instructions or pieces of software, firmware, or a combination thereof. The processor(s) 250 can be semiconductor-based that include semiconductor material that can perform digital logic. The memory 230 may include any type of storage device that stores information in a format that can be read and/or executed by the processor(s) 250. The memory 230 may store applications and modules that, when executed by the processor(s) 250, perform certain operations. In some examples, the applications and modules may be stored in an external storage device and loaded into the memory 230.

In some implementations, the computing device 200 may access additional resources 210 to facilitate the detection and tracking of user inputs. In some implementations, the additional resources 210 may be accessible to the computing device 200 via the network 206 and/or within the external resources 202. In some implementations, the additional resources may be available within the computing device 200. The additional resources 210 may include, for example, one or more databases and/or and one or more processing algorithms to facilitate the detection and tracking of user inputs. In some implementations, the additional resources include, for example, a perception module that provides for two dimensional visual tracking (for example, of objects detected within the field of view of the camera 260), three dimensional pose estimation, six-degree-of-freedom pose estimation (for example, of objects detected within the field of view of the camera 260), hand tracking, and the like. In some implementations, the additional resources 210 include representation databases including, for example, a database of visual patterns associated with objects, and movement of objects within the field of view of the camera 260, a database of virtual widgets for representation of various functionalities, a database of relationships between various tracked objects, and the like. In some implementations, the additional resources include a transcription engine, providing for transcription of detected audio commands for processing by the control system 270 and/or the processor(s) 250.

Figure 3A:
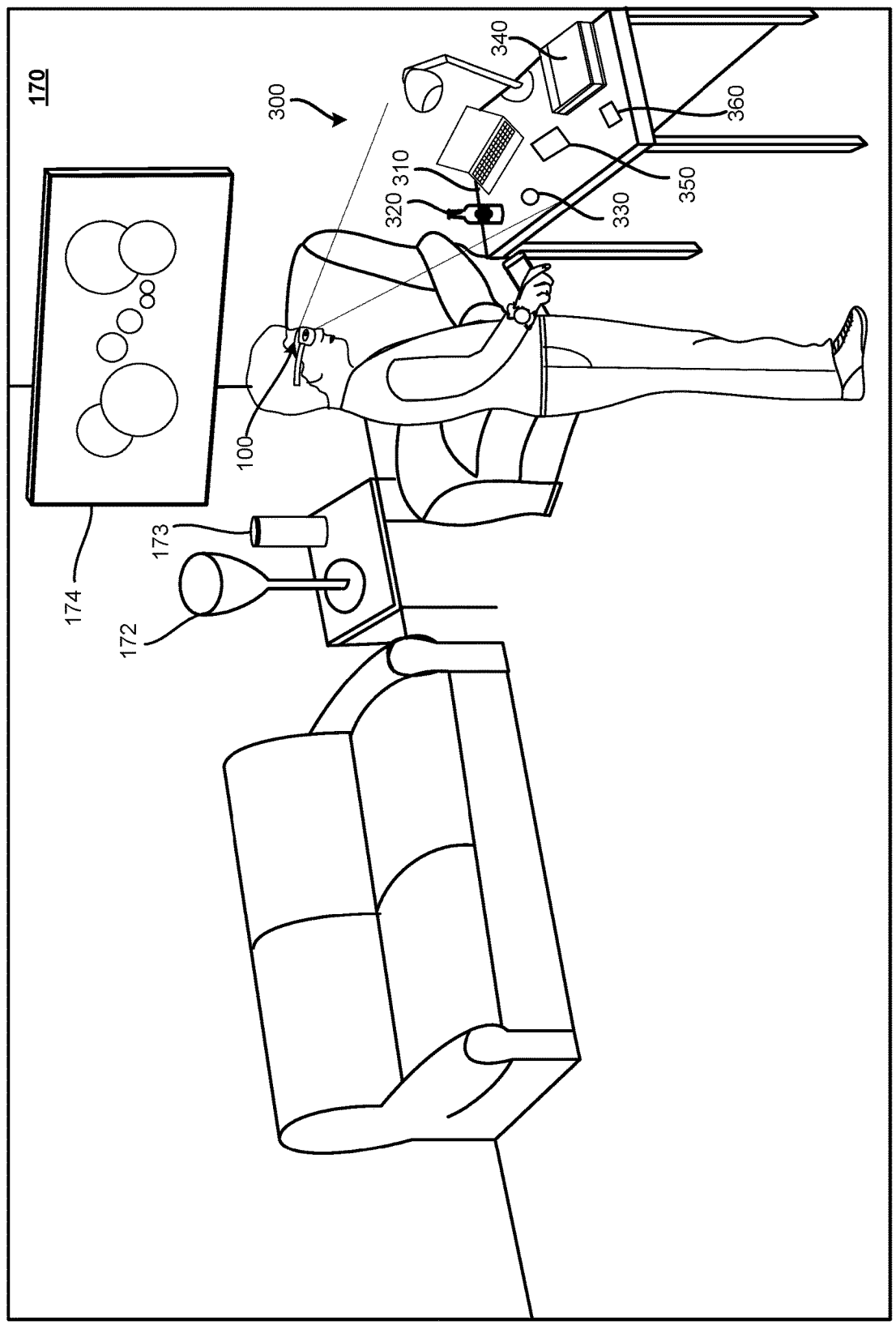
FIGS. 3A and 3B illustrate objects in the ambient environment in the field of view of the user.
Figure 3B:
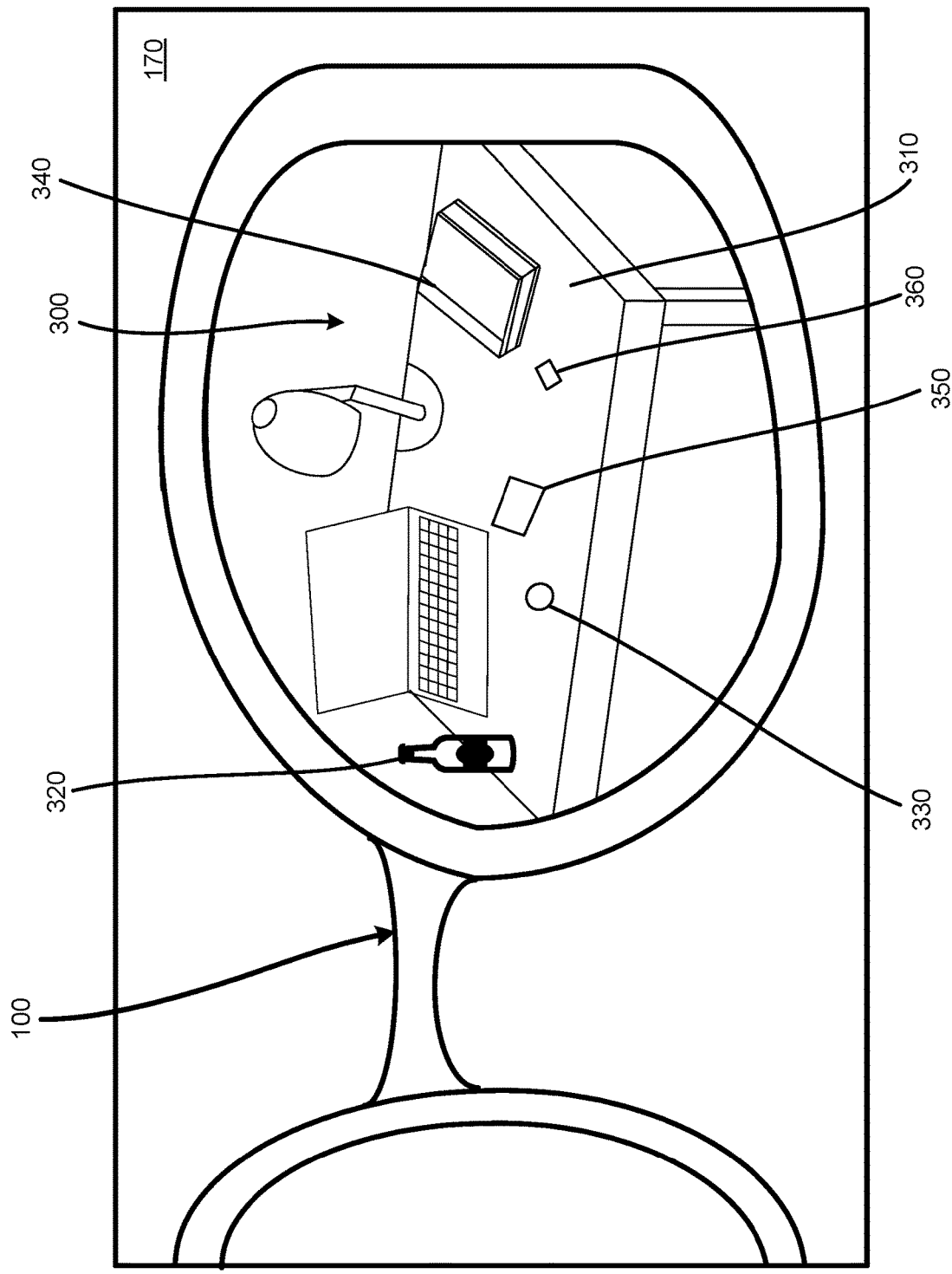

FIG. 3A is a third person view of the user in the ambient environment 170. The user may view the ambient environment 170, and objects in the ambient environment 170, through the lenses of the example HMD 100, as shown in FIG. 3B. In the view shown in FIG. 3A, the user has moved towards a workspace 300 in the ambient environment 170, such that example objects within the area of the workspace 300 are visible to the user, and are captured within the field of view of the camera 116 of the HMD 100. In the example shown in FIGS. 3A and 3B, the workspace 300 includes a number of tangible objects in the ambient environment 170 which provide opportunistic user interfaces for interaction in an AR/MR/VR environment. In the example shown in FIGS. 3A and 3B, the example tangible objects include a bottle 320, a disc shaped object 330 (such as a coin), a book 340, a card 350 and a pin 360 positioned on a work surface 310. The objects shown in FIG. 3A are just some examples of tangible objects that could be enlisted for use in providing for user interfaces to facilitate user interaction in AR/MR/VR environments. The principles to be described herein may be applied to other types of tangible objects that may provide for opportunistic user interfaces in AR/MR/VR environments.

FIGS. 4A-4H illustrate an example system and method in which real world, tangible objects may be enlisted as mechanisms for user interfaces. The example illustrated in FIGS. 4A-4H are described with respect to the use of the HMD 100 for the output of AR/MR/VR content, and user interaction with the content, simply for purposes of discussion and illustration. The principles to be described herein may be applied to the use of other types of computing devices that provide for user interaction with content output by the computing device.

In some examples, the user may wish to use, for example, a surface to view and/or interact with content and/or information that can be output by the HMD 100. In the example shown in FIG. 4A, the user has picked up the card 350 from the work surface 310, so that the card 350 is in the field of view of the user/visible through the lens(es) of the HMD 100, and within the field of view of the camera of the HMD 100, with a first surface 351 of the card 350 facing the user. The system may detect the card 350 within the field of view of the camera of the HMD 100, and may identify or recognize the card 350 based on, for example, previously stored images and/or information in the database associated with the configuration of the card, information contained on the card and the like. In some examples, this may be carried out by a recognition engine working in connection with information stored in the database(s) of the additional resources 210 available to the HMD 100. In some examples, the system may detect the surface 351 of the card, and identify the surface 351 as a receiving surface for output of content, a user interface, and the like.

Figure 4A:
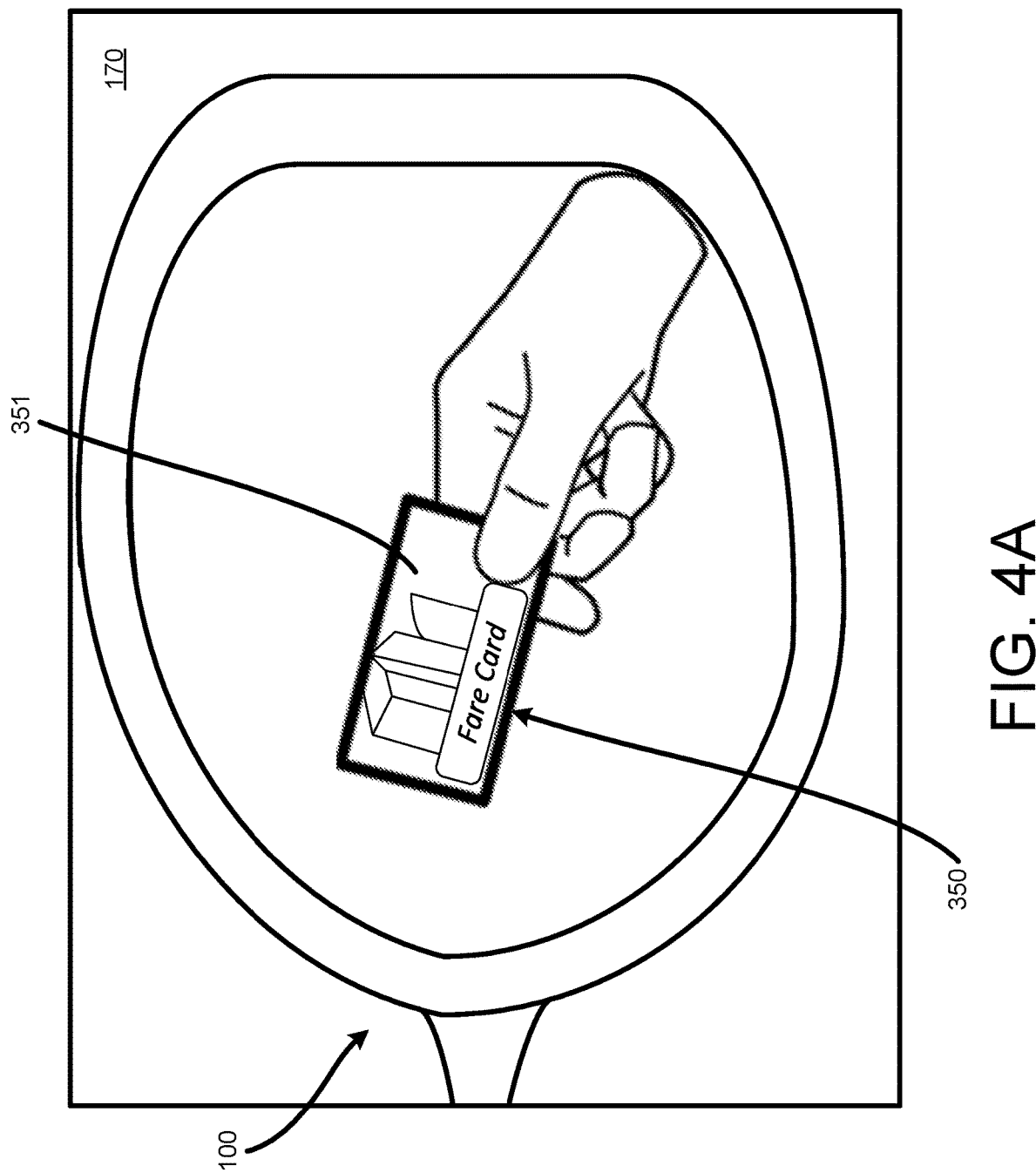
FIGS. 4A-4H illustrate an example system for use of physical objects in the ambient environment as mechanisms for user interfaces in an AR/MR/VR environment, in accordance with implementations described herein.
Figure 4B:
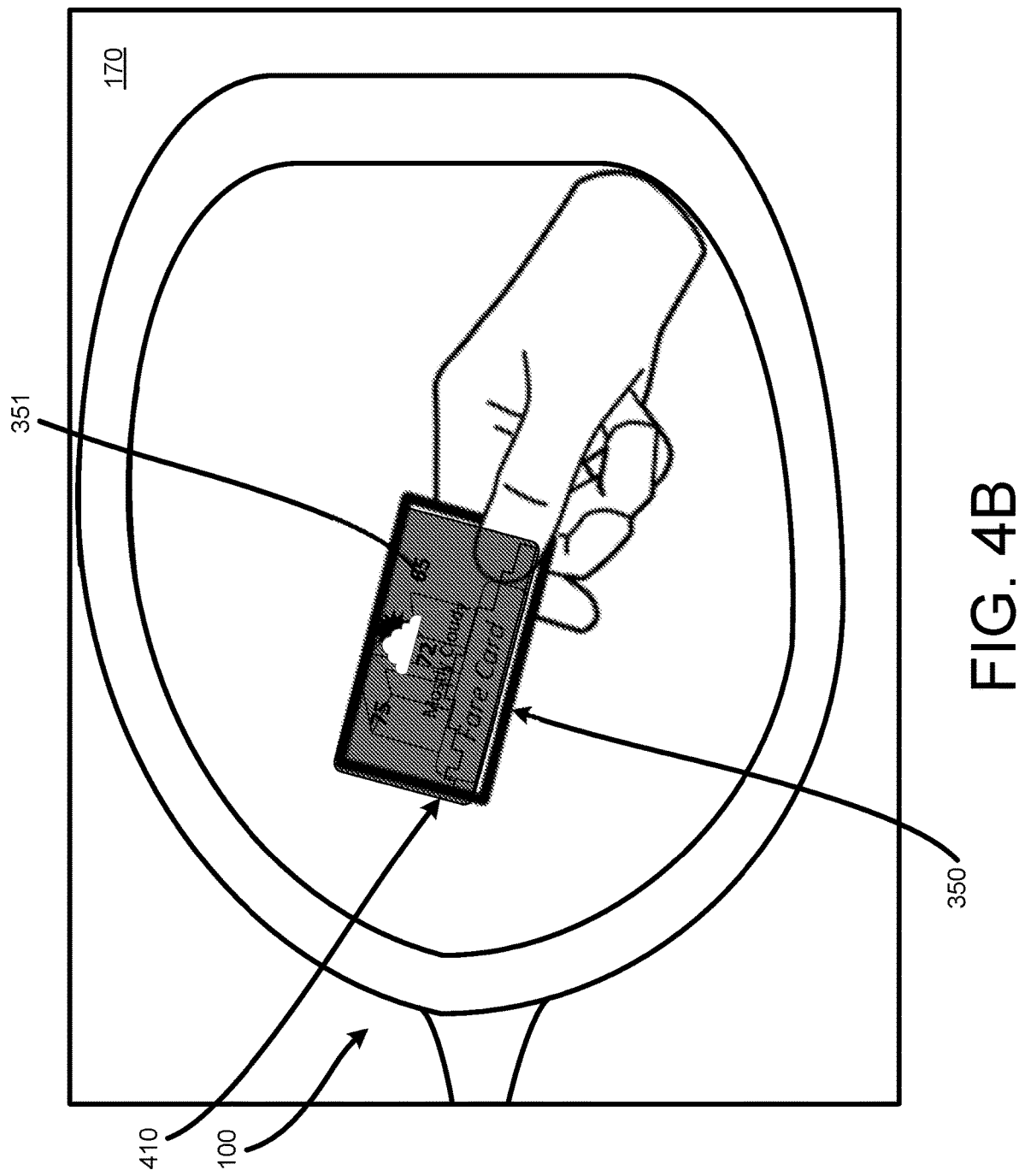

The user may issue a command to cause content to be output on a surface of the card 350, to facilitate use interaction with the content. In some examples, the command may be a verbal, or audible command that is detected by the audio sensors of the HMD 100 and processed by the transcription engine. In some examples, the command may be a gesture detected by the camera and recognized by the perception modules, a manipulation of a control device of the HMD 100, and the like. In some examples, in response to the detection of the card 350 within the field of view of the camera of the HMD 100 and the detection of the command, the HMD 100 may execute a corresponding action. In this example, the action to be performed may be the designation of the card 350 as a user interface implement. In the example shown in FIG. 4B, in response to a user command to display today's weather on the card 350, a user interface 410 may be output on, or displayed on the first surface 351 of the card 350. The user interface 410 may be, for example, a weather widget output on the card 350. In some examples, the system may access or retrieve the weather widget from the additional resources 210 available to the HMD 100. In some examples, the user interface 410 may be displayed within the confines of the first surface 351 of the card 350, as shown in FIG. 4B.

Figure 4C:
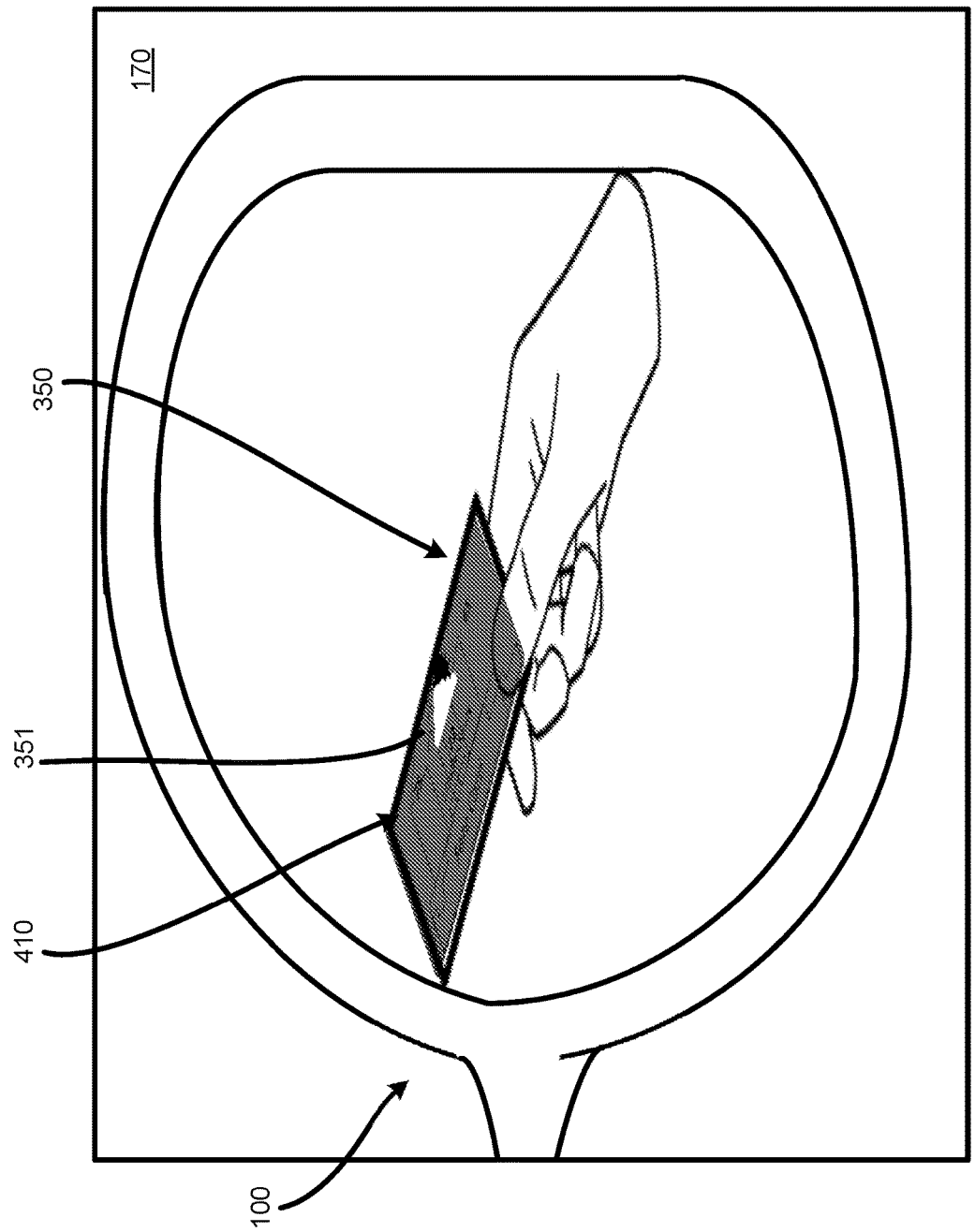

In some examples, the user interface 410 may remain attached to the first surface 351 of the card 350 as the card 350 is moved, as shown in FIG. 4C. In some examples, at least one feature of the card 350 may be mapped to at least one corresponding feature of the user interface 410, to provide for coordinated movement of the user interface 410 in response to movement of the card 350. That is, as the card 350 is moved, and an orientation of the card 350 changes, a distance of the card 350 from the HMD 100 changes, and the like, the user interface 410 may remain attached to the card 350 due to the mapping of the respective features. Changes in the position and/or orientation of the card 350 may be detected and tracked by the perception modules, and corresponding changes to the position and/or orientation of the user interface 410 may be implemented accordingly. A change in position and/or orientation of the card 350 may facilitate further user interaction with the content output on the card 350.

Figure 4D:
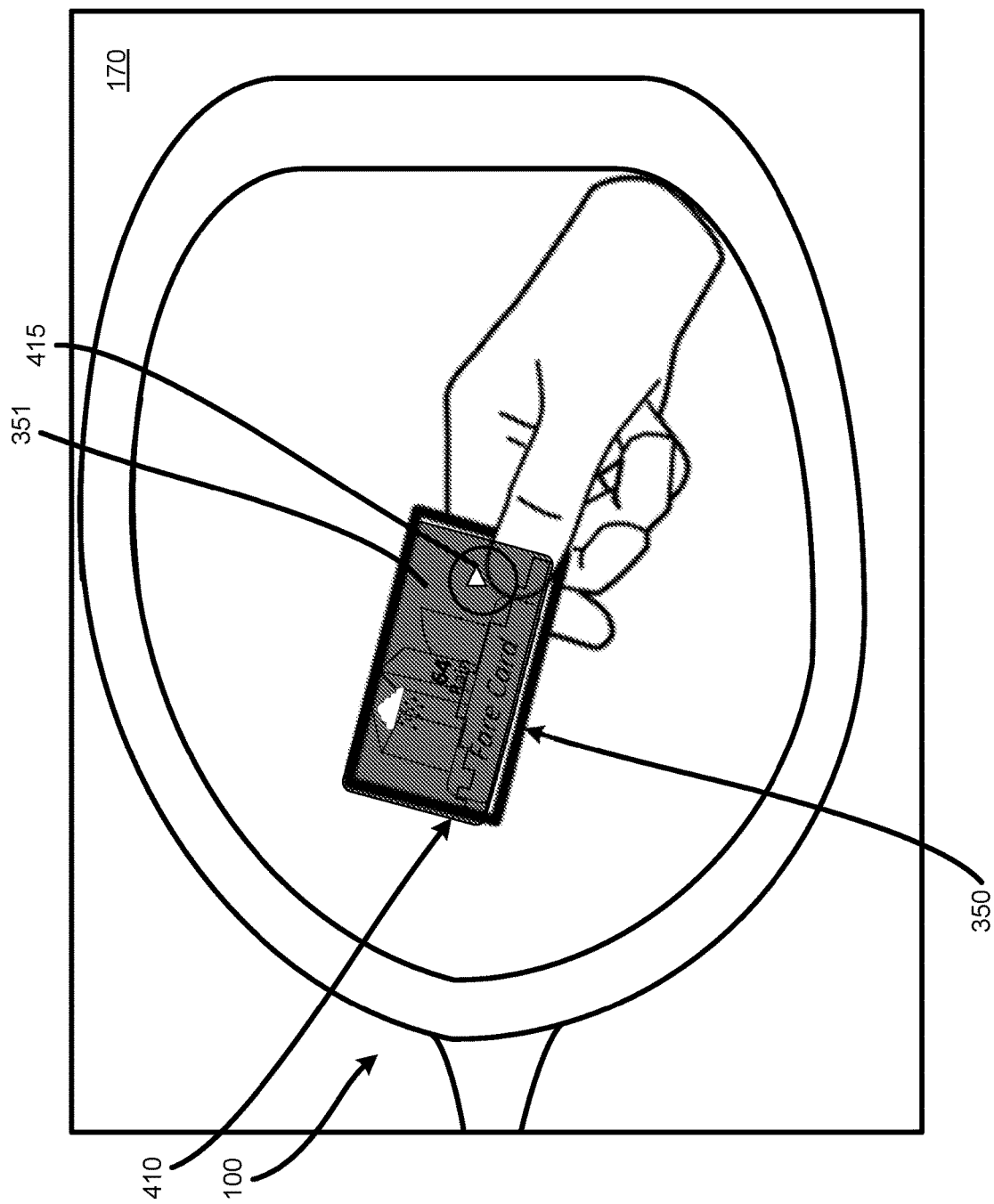

In some examples, the user interface 410 may include a user interface element 415 allowing for user input into and/or interaction with the content displayed on the card 350 via the user interface 410. Interaction with the user interface element 415 may cause an action to be executed by the HMD 100. In some examples, the user manipulation of the card 350, in the form of the user interaction with the user interface element 415, may cause a change in a control algorithm associated with the user interface 410. In the example shown in FIG. 4D, the user interface element 415 is an icon that is selectable by the user. In this example, selection by the user causes the weather widget to advance by a day, and to display the weather for the following day. That is, a user input at the user interface element 415, for example, a tap at the user interface element 415, may cause a change in a control algorithm associated with the user interface 410, causing the user interface 410 to display the weather for the following day (rather than the current day, or a previously selected day). Subsequent inputs at the example user interface element 415 may cause the weather widget to continue to advance to display weather for subsequent days. In the example shown in FIG. 4D, the hand tracking module may detect the presence of the finger of the user within the field of view of the camera of the HMD 100, and may detect the tapping motion at the user interface element 415. The user interface element 415 shown in FIG. 4D is just one example of a user interface element that may be manipulated by the user to provide an input to a user interface displayed as described with respect to FIGS. 4A-4D. Various other types of user interface elements may also be displayed, to receive other types of inputs and/or to cause other types of information to be displayed and/or action to be taken.

Figure 4E:
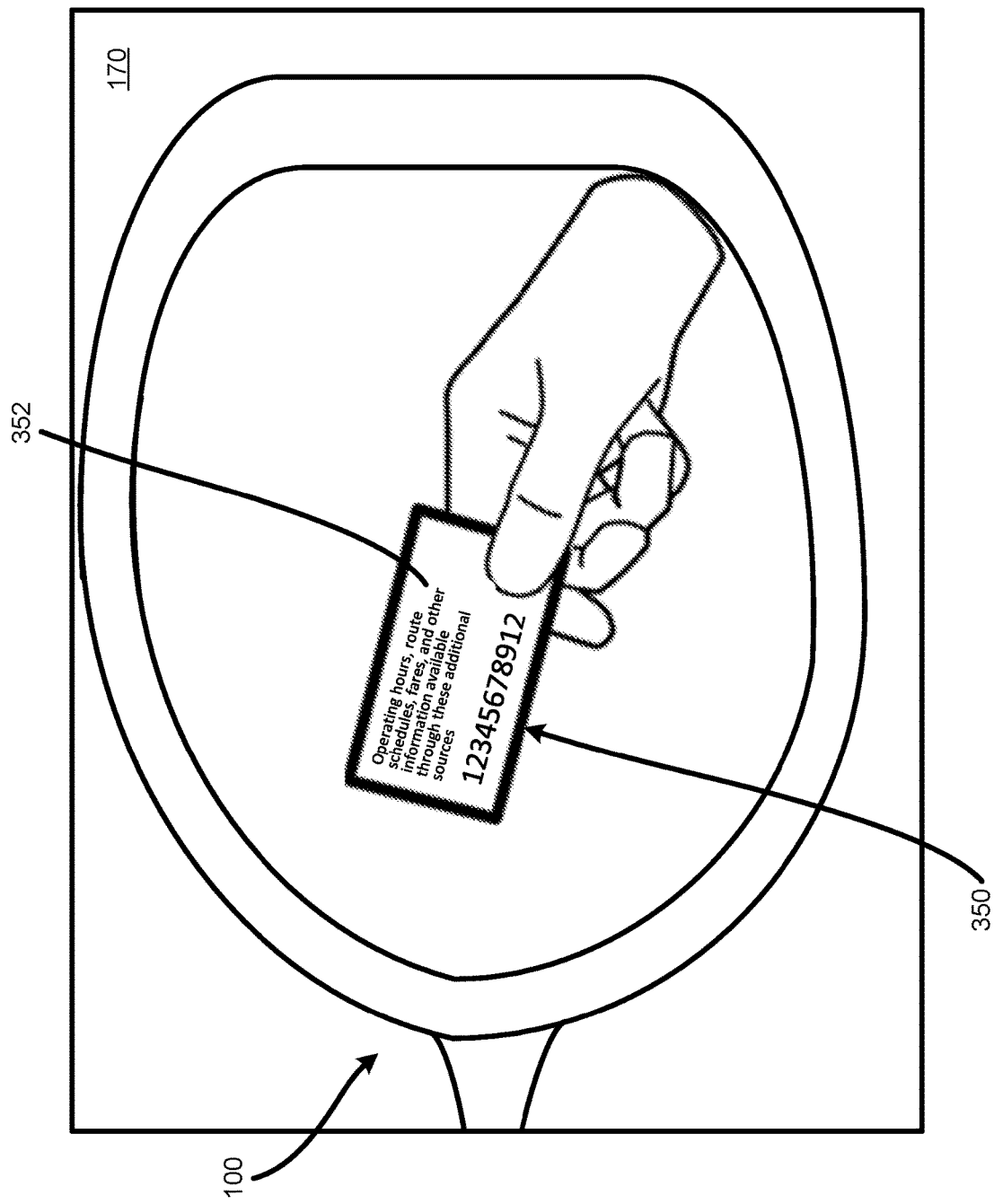

In FIG. 4E, the user has flipped the card 350 so that a second surface 352 of the card 350 is visible within the field of view of the camera of the HMD 100. In this example, the user manipulation of the card 350, in the form of flipping the card 350, may trigger a change in a control algorithm associated with the user interface 410 associated with the card 350 as a user interface implement. In this example, in response to the detected flipping of the card 350, an action may be executed to change a functionality of the card 350 as a user interface implement. For example, the user may issue a command to cause content to be output on the second surface 352 of the card 350. In some examples, the command may be a verbal, or audible command that is detected by the audio sensors of the HMD 100 and processed by the transcription engine. In some examples, the command may be detected based on a function triggered in response to an element recognized on the second surface 352 of the card 350 (i.e., text, a quick response code and the like), a gesture detected by the camera and recognized by the perception modules, a manipulation of a control device of the HMD 100, and the like. In this example, the flipping of the card 350 may signal a change in a control algorithm associated with the desired functionality of the use of the card 350 as a user interface implement.

Figure 4F:
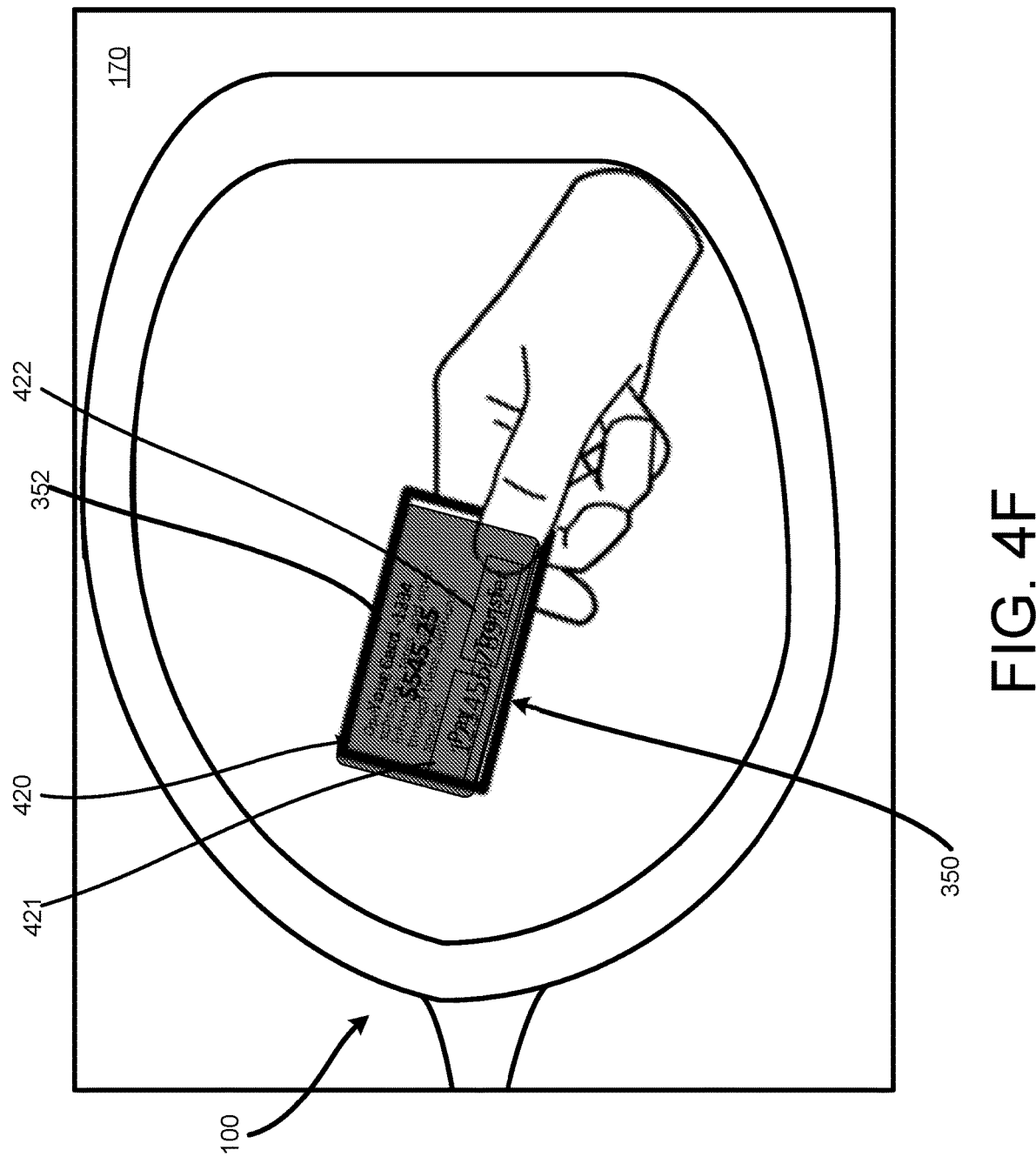

In the example shown in FIG. 4E, the flipping of the card and a user command to provide the balance on the card 350, triggers the output of a user interface 420 on the second surface 352 of the card 350, as shown in FIG. 4F. The example user interface 420 shown in FIG. 4E provides the requested balance on the card 350. The example user interface also provides a first example user interface element 421, allowing the user to pay the outstanding balance, and a second example user interface element 422, allowing the user to transfer funds to and/or from the card 350. As with the example described with respect to FIG. 4D, inputs (for example touch or tap inputs) at one of the example user interface elements 421, 422 may rely on the detection by the hand tracking module of the presence of the finger of the user within the field of view of the camera of the HMD 100, and the tapping motion at one of the example user interface elements 421, 422.

Figure 4G:
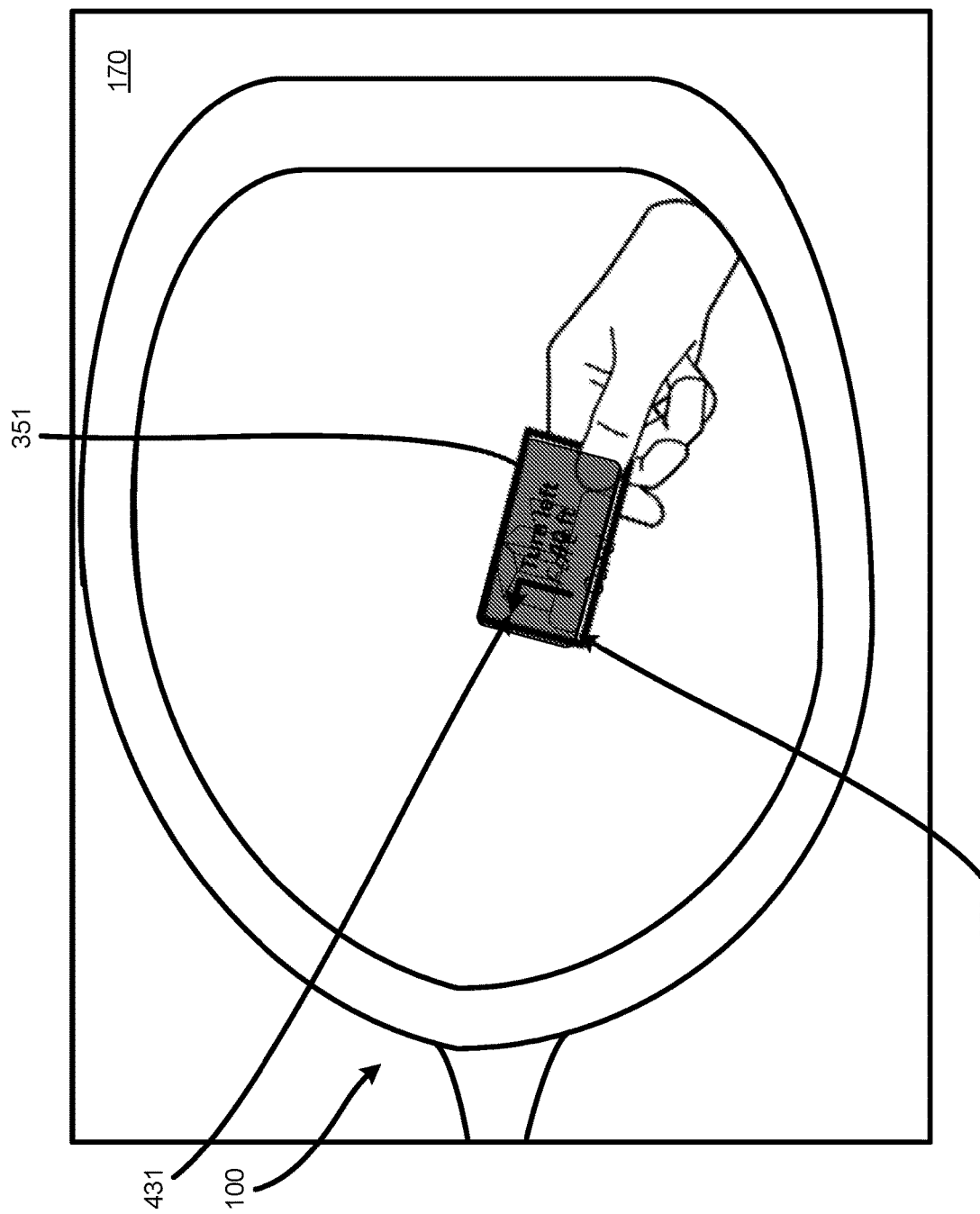
Figure 4H:
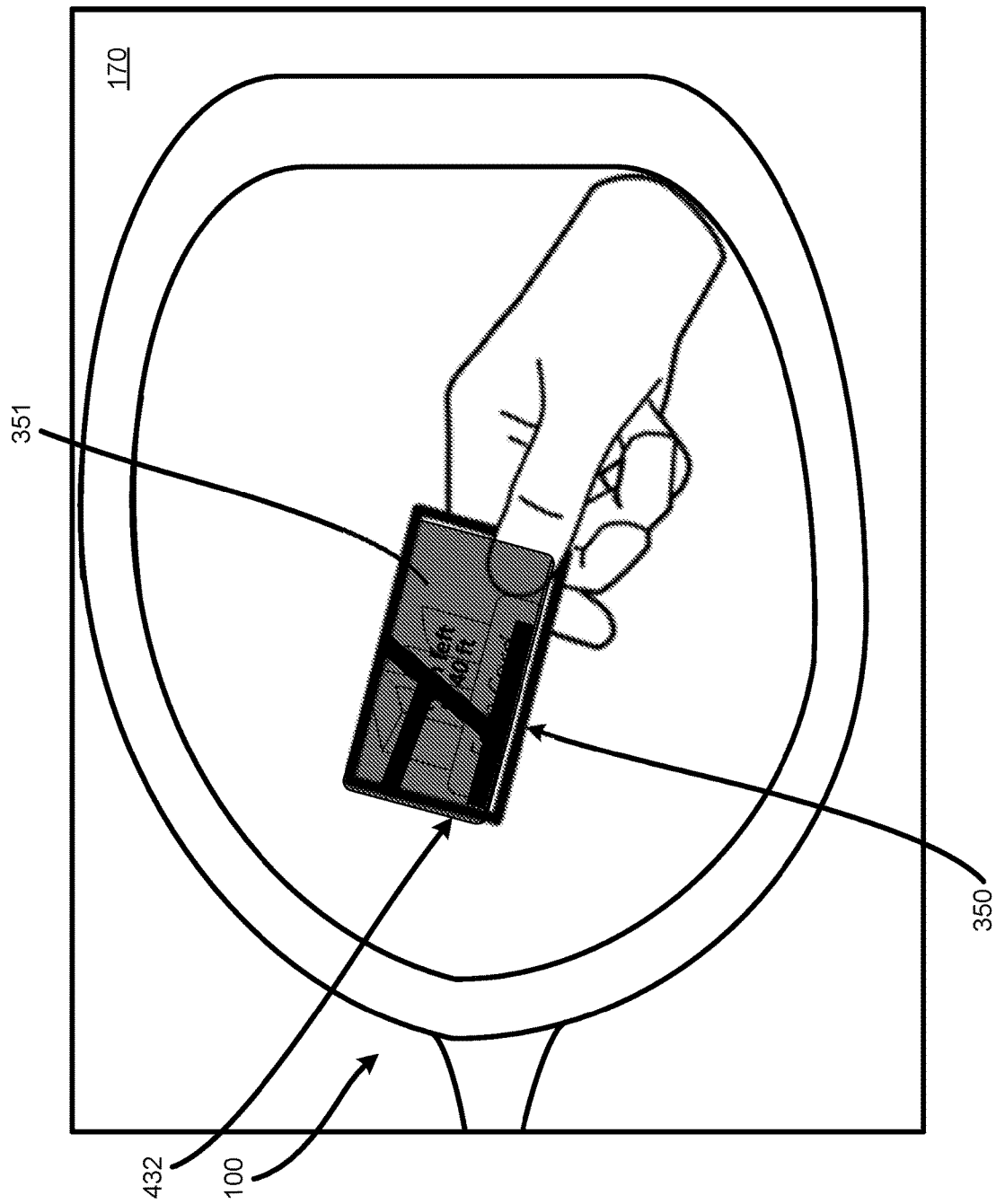

In the example shown in FIG. 4G, a first user interface 431 has been output on, or displayed on the first surface 351 of the card 350. The system may display a first user interface 431 in response to a user command (i.e., a verbal, or audible command, or other type of command) to display navigation to a particular location on the card 350. In the arrangement shown in FIG. 4G, the card 350 is held by the user at a first position, for example at a first distance from the HMD 100. In FIG. 4H, the position of the card 350 has changed in response to a user manipulation of the card 350. That is, in FIG. 4H, the card 350 is held by the user at a second position, for example, at a second distance from the HMD 100 that is less than the first distance, such that the card 350 is closer to the HMD 100. Thus, the user has moved the card 350 closer to the HMD 100, mimicking a zoom in, to provide a closer look at the information provided. In this closer position, the user manipulation of the card 350 has triggered a change in a control algorithm associated with the user interface such that a second user interface 432 is displayed. The second user interface 432 may provide a more detailed view of the navigation provided in the first user interface 431. Thus, in some examples, an appearance of the user interface may change, or morph, as a position and/or an orientation of the card changes. In some examples, the change in appearance may include a change in the information provided and/or accessible to the user. The change in appearance, and the corresponding change in information provided and/or accessible to the user based on a distance between the card 350 and the HMD 100 may allow the system to provide additional information to the user without the need for specific user inputs (i.e., verbal/audible commands, tap inputs, manipulation of the HMD 100 and the like) beyond the natural movement of the card 350.

The use of the first and second surfaces 351, 352 of the card 350 to display user interfaces may provide the user with a way to interact with the content output by the HMD 100, using a tangible object as an anchor for the content, and for the input provided via the user interfaces displayed on the card 350. The output of content using the surfaces 351, 352 of the card 350 to anchor the display of user interfaces is provided merely by way of example. Other relatively flat surfaces available to the user in a similarly opportunistic manner may also be employed to provide similar functionality.

Figure 5A:
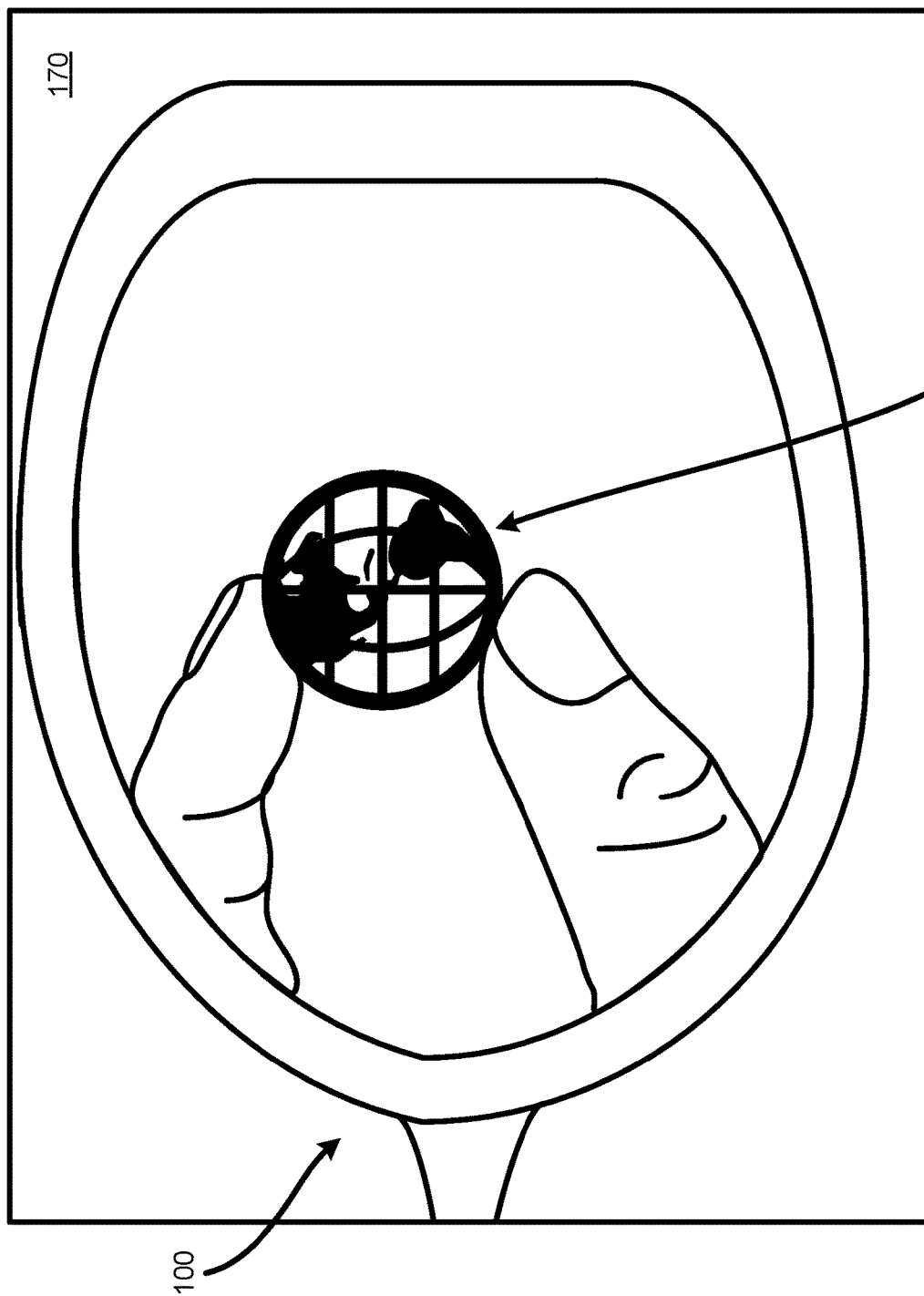
FIGS. 5A-5F illustrate an example system for use of physical objects in the ambient environment as mechanisms for user interfaces in an AR/MR/VR environment, in accordance with implementations described herein.

FIGS. 5A-5F illustrate an example in which a user interface is attached to the disc shaped object 330, or coin 330. As shown in FIG. 5A, the user has picked up the coin 330 from the work surface 310, so that the coin 330 is in the field of view of the user/visible through the lens(es) of the HMD 100, and within the field of view of the camera of the HMD 100. The system may detect the coin 330 within the field of view of the camera of the HMD 100, and may identify or recognize the coin 330 based on, for example, detected features in the images of the coin 330 captured by the camera of the HMD 100 and previously stored images and/or information in the database. In some examples, this may be carried out by a recognition engine working in connection with information stored in the database(s) of the additional resources 210 available to the HMD 100. In some examples, the system may detect and identify features of the coin 330 for use in tracking the movement of the coin 330, and corresponding movement of a user interface attached to the coin 330.

Figure 5B:
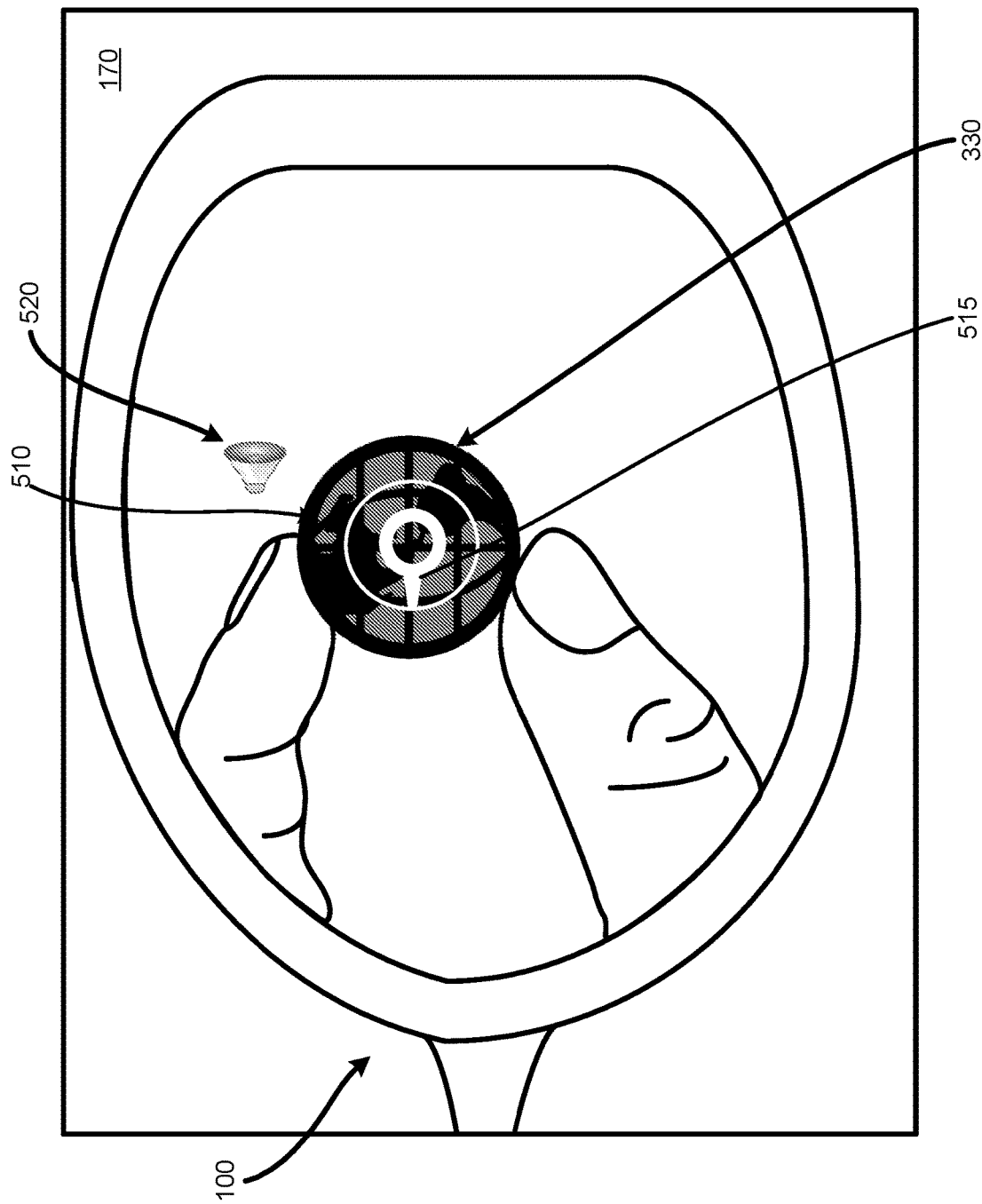
Figure 5C:
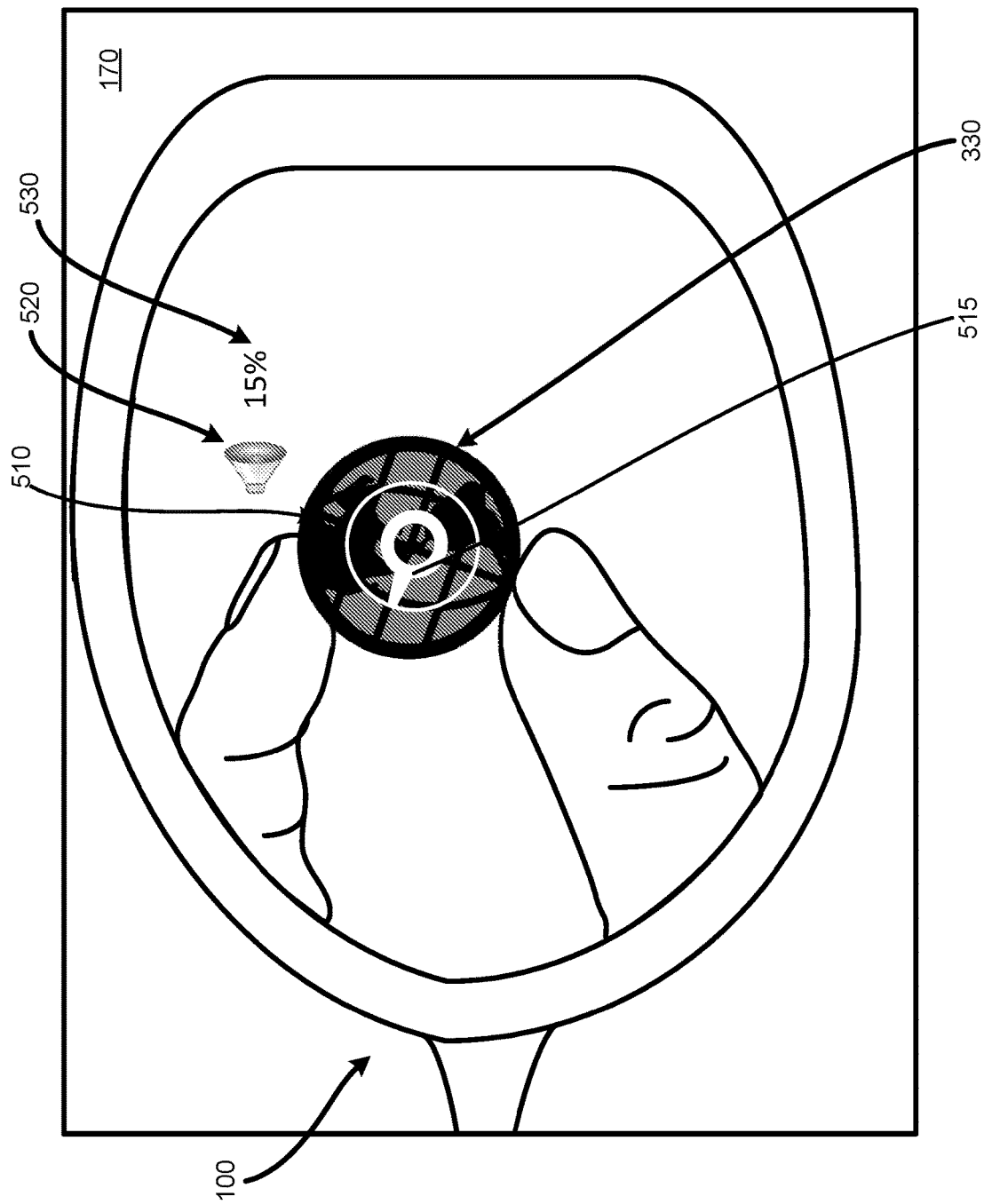
Figure 5D:
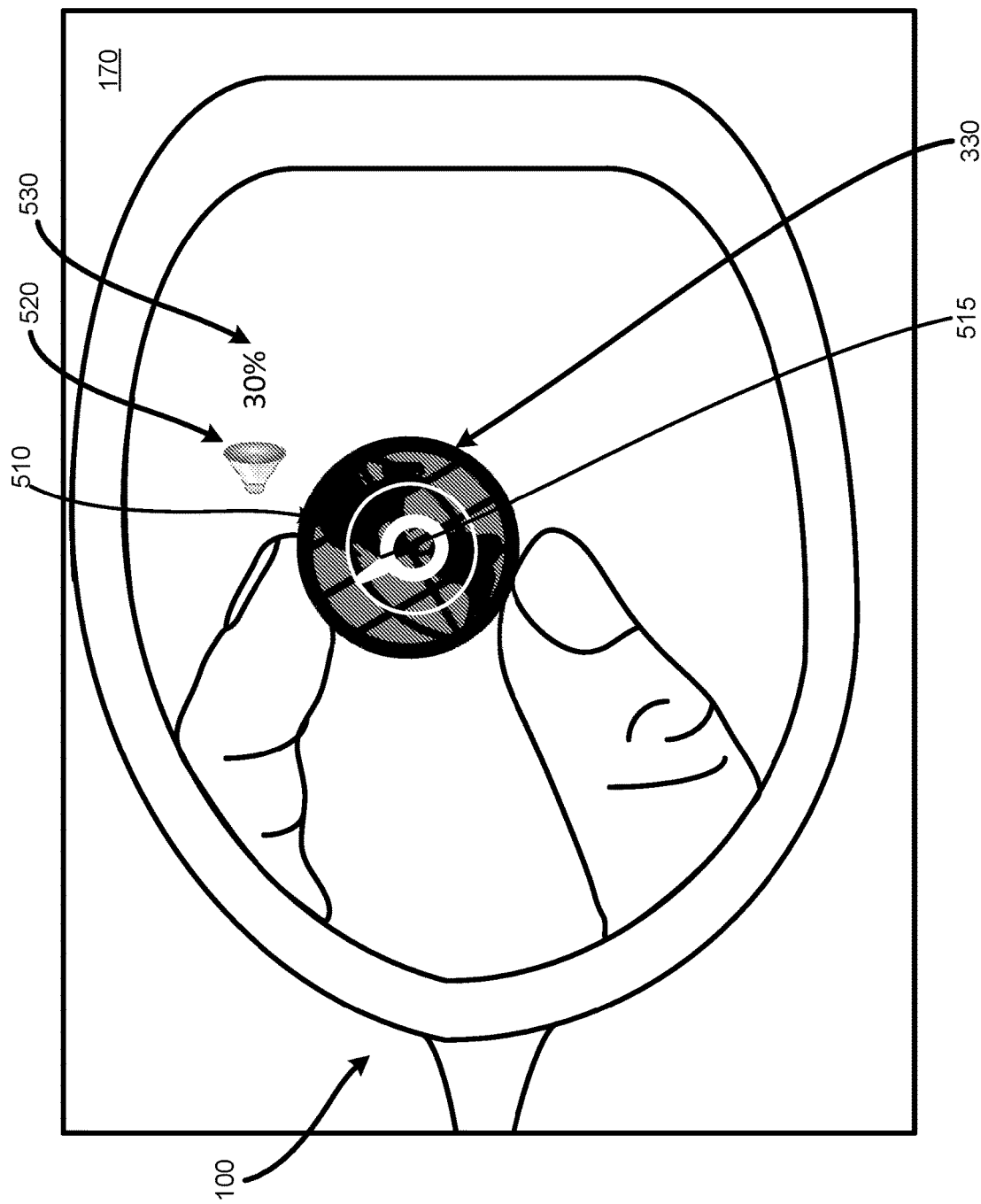
Figure 5E:
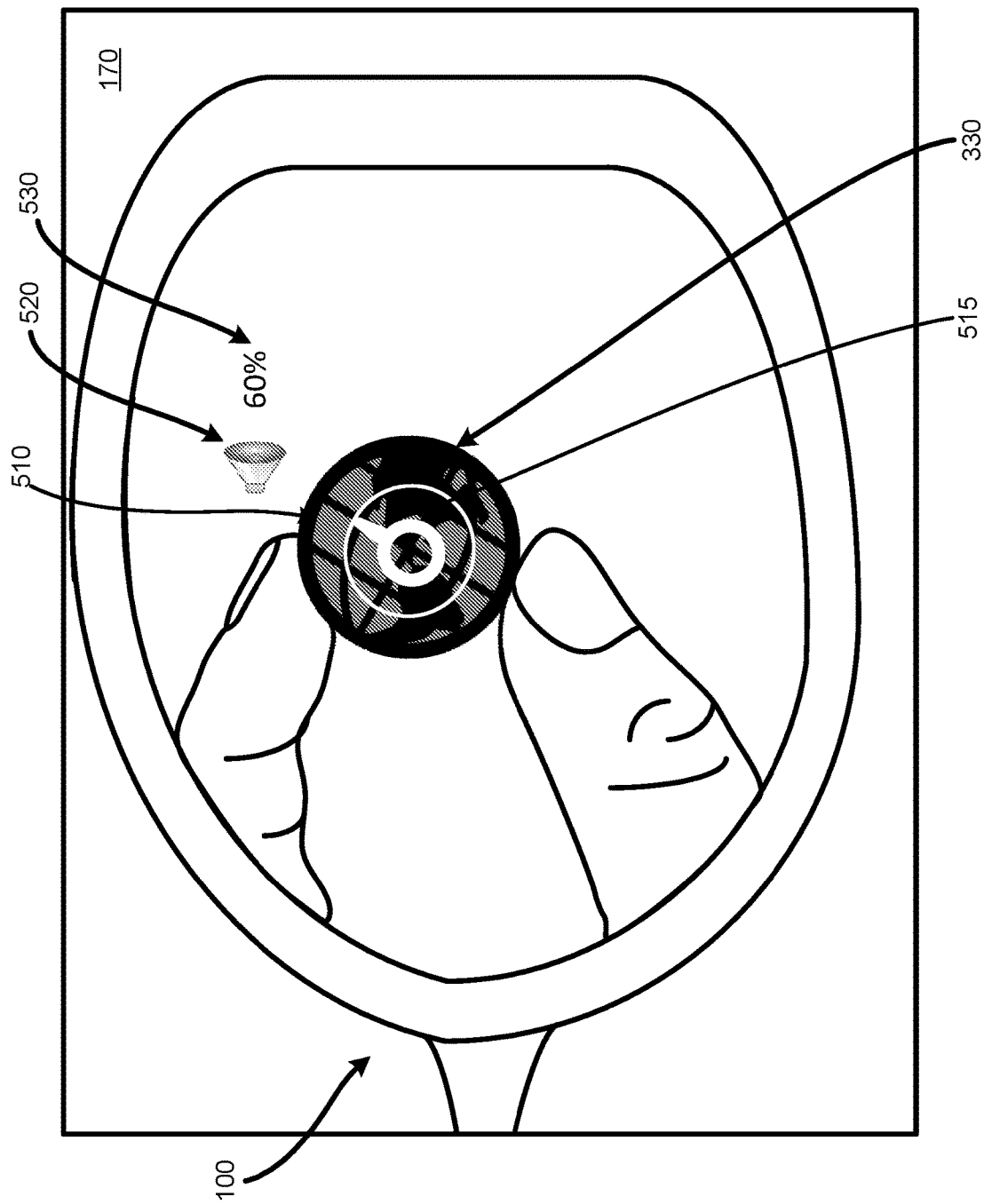
Figure 5F:
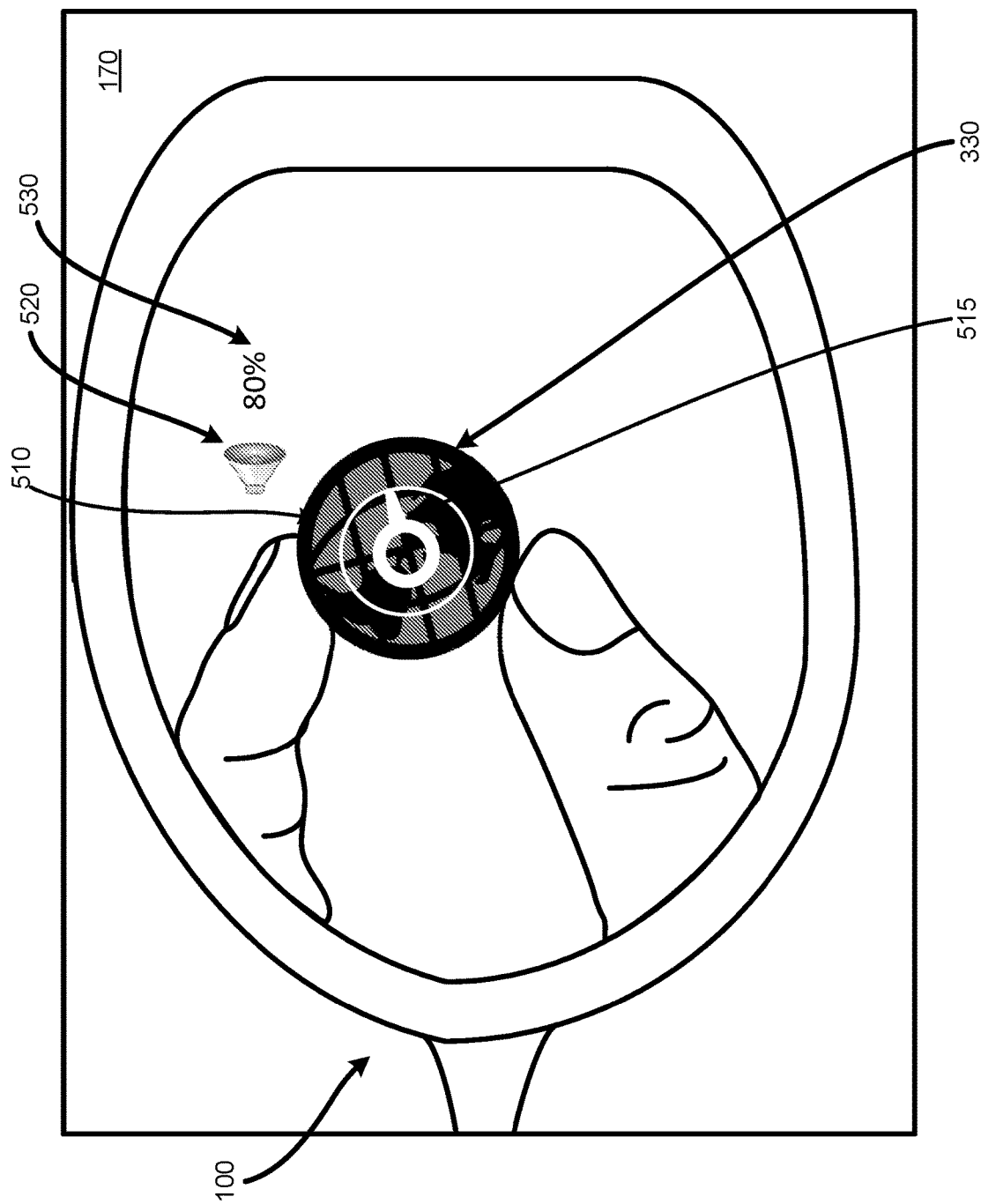
Figure 6A:
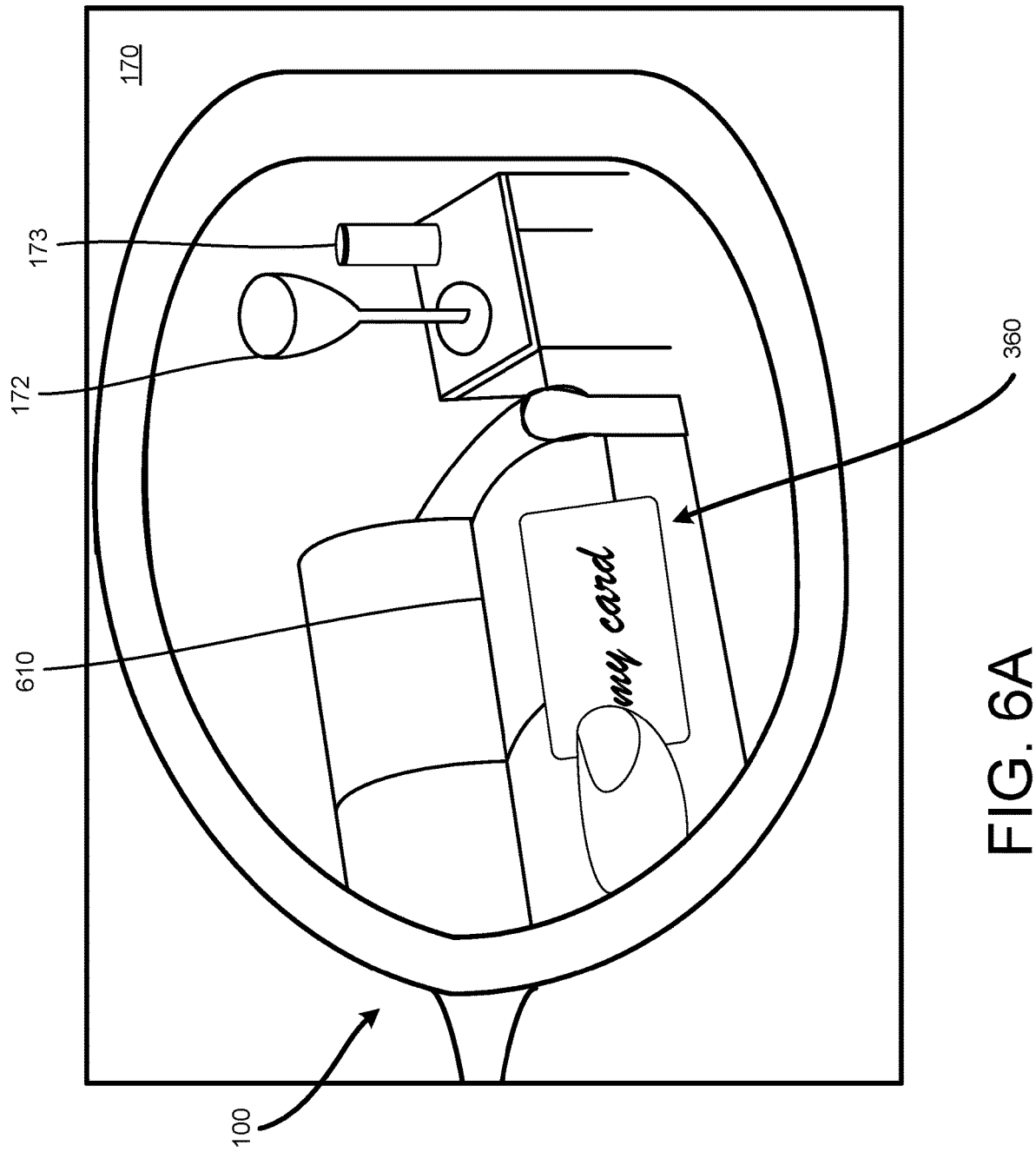
FIGS. 6A-6E illustrate an example system for use of physical objects in the ambient environment as mechanisms for user interfaces in an AR/MR/VR environment, in accordance with implementations described herein.
Figure 6B:
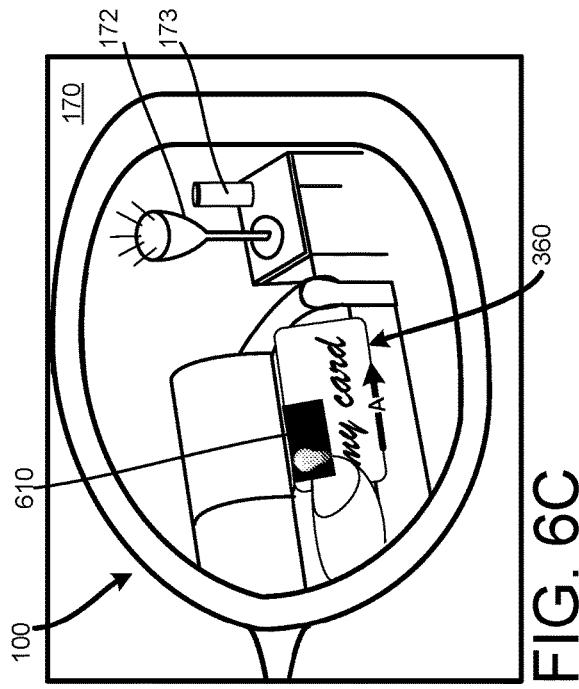
Figure 6C:
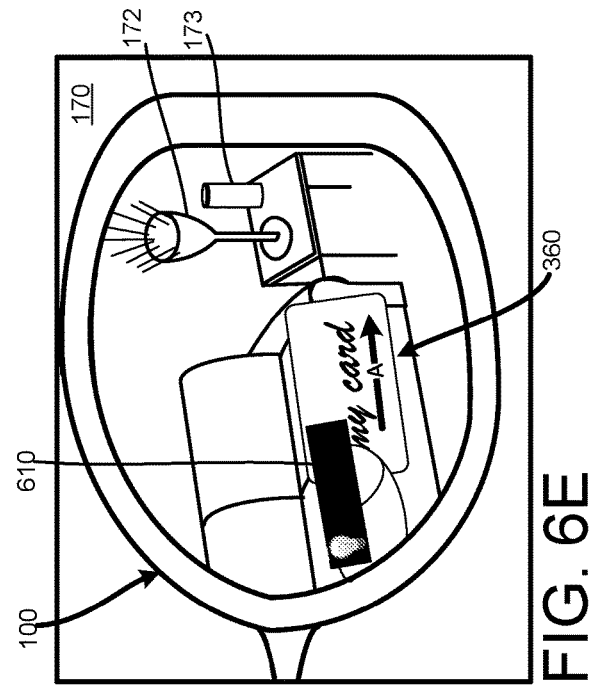
Figure 6D:
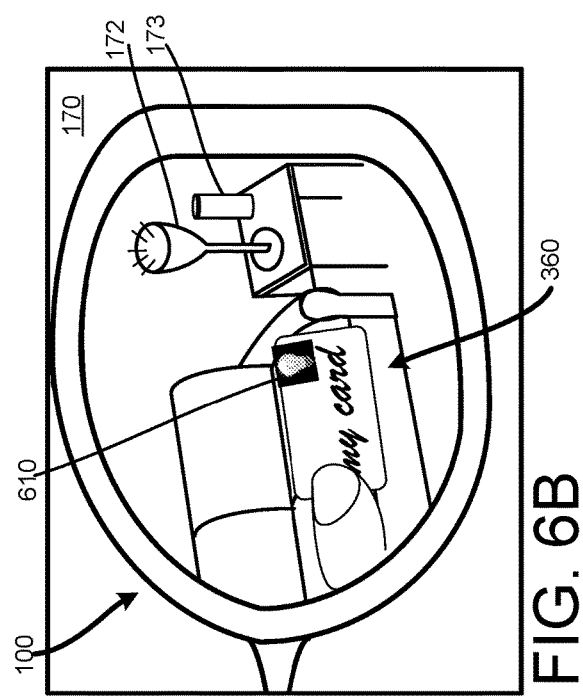
Figure 6E:
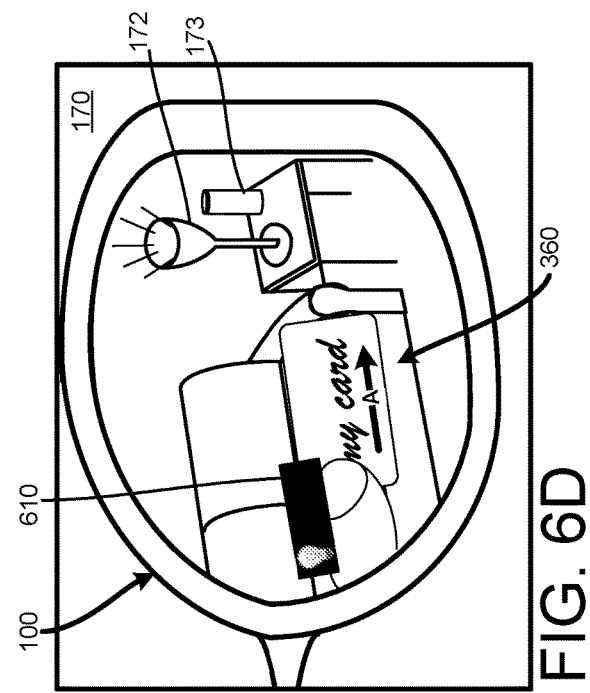

The user may issue a command to cause content to be output on a surface of the coin 330. In some examples, the command may be a verbal, or audible command that is detected by the audio sensors of the HMD 100 and processed by the transcription engine. In some examples, the detection of the coin 330 in the field of view of the camera of the HMD 100 and the detection of the command may cause the system to execute an action designating the coin 330 as a user interface implement. In the example shown in FIG. 5B, in response to a user command to display a volume controller on the coin 330, a user interface 510 is output on, or displayed on the coin 330, designated as the user interface implement, as shown in FIG. 5B. The user interface 510 may be manipulated by the user to, for example, control an audio output level of the smart speaker 173 in the ambient environment 170 that is connected to and controllable via the HMD 100. The user interface 510 includes a selection indicator 515, corresponding to a selected volume level. In some examples, the selection indicator 515 may be mapped to, or attached to, a particular feature on the coin 330. Mapping of a point on the selection indicator 515 to a corresponding feature on the coin 330 may provide for coordinated movement of the selection indicator 515 (virtually overlaid on the coin 330) as the coin 330 is moved, or manipulated by the user. In this manner, user manipulation of the coin 330 (movement, or rotation, of the coin 330) to adjust the volume level causes the selection indicator 515 to move together with the coin 330, providing a visual indication of a desired change in volume level. The rotation of the coin 330, functioning as a volume controller for the smart speaker 173 in this example, in turn triggers the change in volume level of the smart speaker 173 connected to and/or controllable by the HMD 100. In some examples, the user interface 510 may include a mode indicator 520 indicating that the system is in volume control mode and/or a volume level indicator 530 indicating a current volume level. FIGS. 5D, 5E and 5F illustrate rotation of the coin 330, and corresponding rotation of the selection indicator 515 of the user interface 510, through increasing volume levels. As shown in FIGS. 5D-5F, as the coin 330 is rotated, the selection indicator 515 of the user interface 510, which may be attached to the coin 330 and/or mapped to a selected feature of the coin 330, rotates together with the coin 330. This allows the coin 330 to function as a volume adjustment knob for controlling system volume. The ready, opportunistic availability of the coin 330, and the ability to have the coin 330 function as a volume adjustment knob in this manner, provides the user with a tangible user interface for the control of volume in an AR/MR/VR environment FIGS. 6A-6E illustrate an example in which a user interface is attached to the example pin 360. As shown in FIG. 6A, the user has picked up the pin 360 from the work surface 310, so that the pin 360 is in the field of view of the user/visible through the lens(es) of the HMD 100, and within the field of view of the camera of the HMD 100. The system may detect the pin within the field of view of the camera of the HMD 100, and may identify or recognize the pin 360 based on, for example, an external contour of the pin 360, detected features in the images of the pin 360 captured by the camera of the HMD 100 and previously stored images and/or information in the database, and the like. In some examples, this may be carried out by a recognition engine working in connection with information stored in the database(s) of the additional resources 210 available to the HMD 100. In some examples, the system may detect and identify features of the pin 360 for use in tracking the movement of the pin 360, and corresponding control of one of the connected/controllable devices in the ambient environment 170.

The user may issue a command to cause the pin 360 to serve as a user interface implement. In some examples, the command may be a verbal, or audible command that is detected by the audio sensors of the HMD 100 and processed by the transcription engine. In the example shown in FIG. 6B, in response to a user command to use the pin 360 as a light intensity controller, a user interface 610 may be output on, or displayed with the pin 360. The pin 360 may then be manipulated by the user to, for example, control a level of light intensity output by the smart light 172 connected to and controllable by the HMD 100. That is, as movement of the pin 360 is detected, a level of light intensity output by the smart light 172 may be adjusted accordingly. The user interface 610 may provide a visual indication of the amount of adjustment of the level of light intensity as the pin 360 is moved. For example, as shown in FIGS. 6B-6E, as the pin 360 is moved in the direction of the arrow A, the level of light intensity output by the smart light 172 increases, and the visual indication provided by the user interface 610 becomes larger, corresponding to the increased level of light intensity. In this manner, as the pin 360 is moved, the light intensity level is adjusted based on a direction and a magnitude of the movement of the pin 360. This allows the pin 360 to function as a light adjustment device for controlling the intensity of light output by the smart light 172. The ready, opportunistic availability of the pin 360, and the ability to have the pin 360 function as in this manner, provides the user with a tangible user interface for the control of light intensity in an AR/MR/VR environment.

Figure 7A:
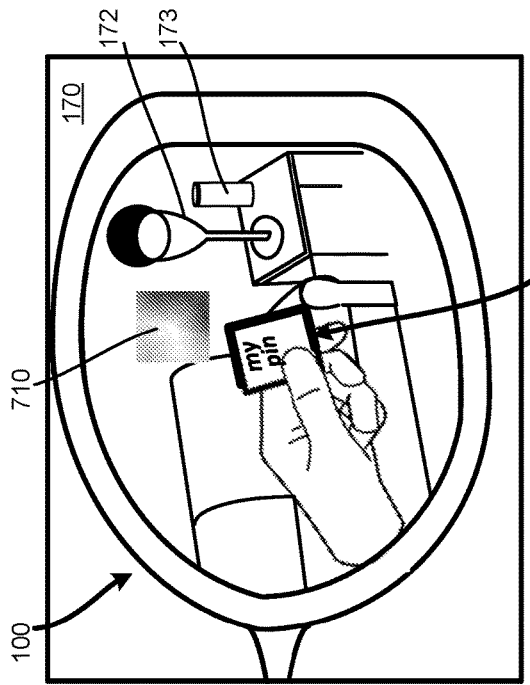
FIGS. 7A-7D illustrate an example system for use of physical objects in the ambient environment as mechanisms for user interfaces in an AR/MR/VR environment, in accordance with implementations described herein.

FIGS. 7A-7D illustrate another example in which a user interface is attached to the example pin 360 to select and/or adjust a color of light output by the smart light 172 connected to and controllable by the HMD 100. As shown in FIG. 7A, the user has picked up the pin 360 from the work surface 310, so that the pin is in the field of view of the user/visible through the lens(es) of the HMD 100, and within the field of view of the camera of the HMD 100. The system may detect the pin 360 within the field of view of the camera of the HMD 100, and may identify or recognize the pin 360 based on, for example, an external contour of the pin 360, detected features in the images of the pin 360 captured by the camera of the HMD 100 and previously stored images and/or information in the database, and the like. In some examples, this may be carried out by a recognition engine working in connection with information stored in the database(s) of the additional resources 210 available to the HMD 100. In some examples, the system may detect and identify features of the pin 360 for use in tracking the movement of the pin 360, and corresponding control of one of the connected/controllable devices in the ambient environment 170.

Figure 7B:
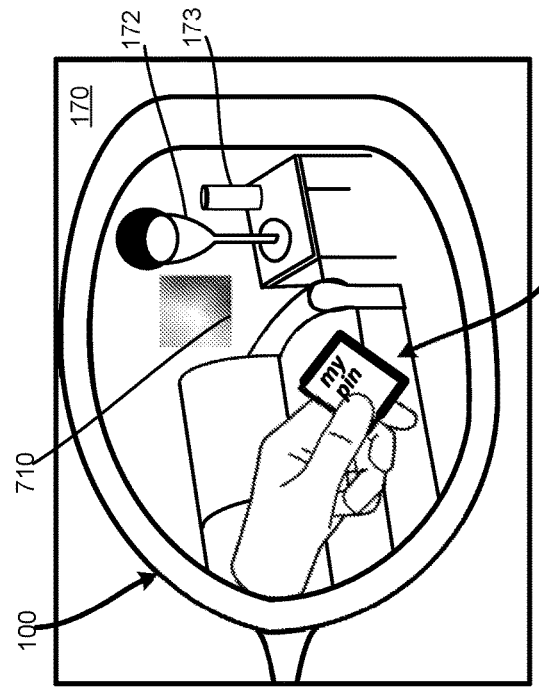
Figure 7C:
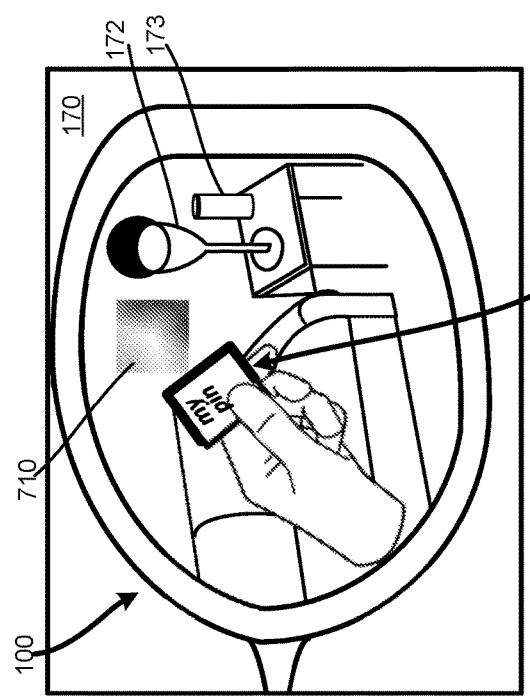
Figure 7D:
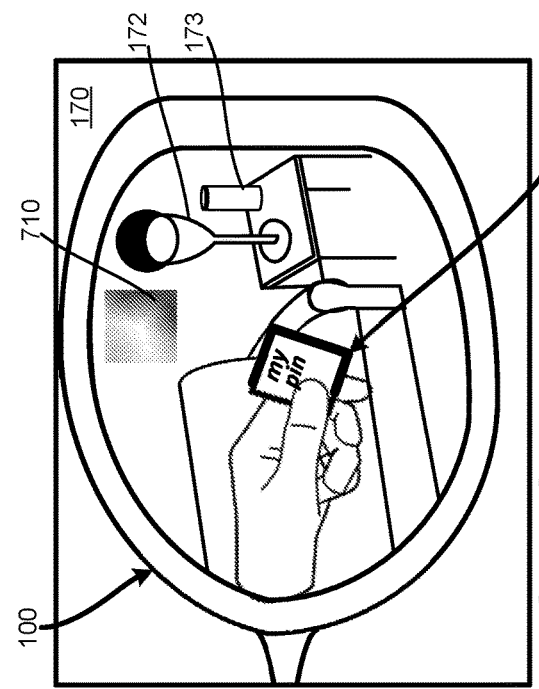

The user may issue a command to cause the pin 360 to serve as a user interface implement. In some examples, the command may be a verbal, or audible command that is detected by the audio sensors of the HMD 100 and processed by the transcription engine. In response to a user command to use the pin 360 as a light color selector, a user interface 710 may be output on, or displayed with the pin 360, as shown in FIG. 7A. The pin 360 may then be manipulated by the user to, for example, select a color of light output by the smart light 172 connected to and controllable by the HMD 100, change a color of light output by the smart light 172, and the like. That is, as movement of the pin 360 is detected, a color of light output by the smart light 172 may be adjusted accordingly, based on the color guide provided by the user interface 710. For example, as shown in FIGS. 7B-7D, as the pin 360 relative to the color guide provided in the user interface 710, the color of light output by the smart light 172 changes. This allows the pin 360 to function as a color selection device for controlling the output of light by the smart light 172. The ready, opportunistic availability of the pin 360, and the ability to have the pin 360 function as in this manner, provides the user with a tangible user interface for the control of light output in an AR/MR/VR environment.

Figure 8A:
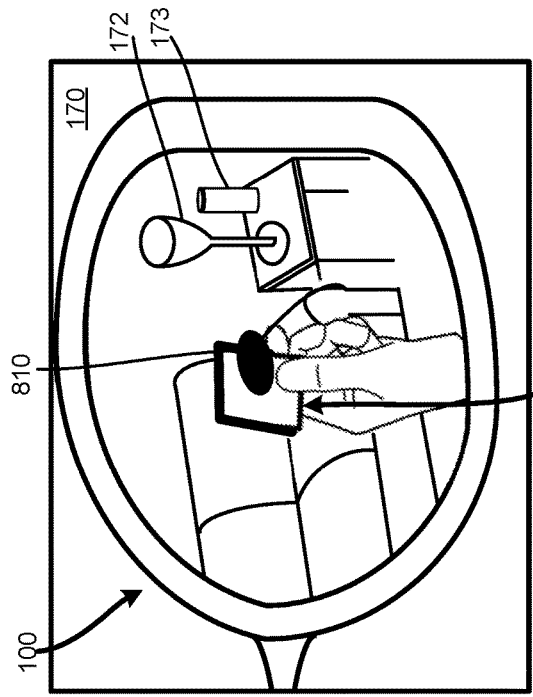
FIGS. 8A-8D illustrate an example system for use of physical objects in the ambient environment as mechanisms for user interfaces in an AR/MR/VR environment, in accordance with implementations described herein.
Figure 8B:
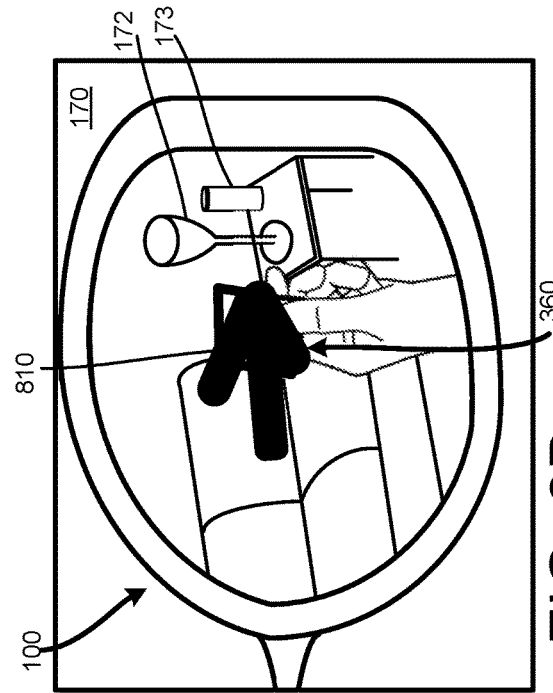
Figure 8C:
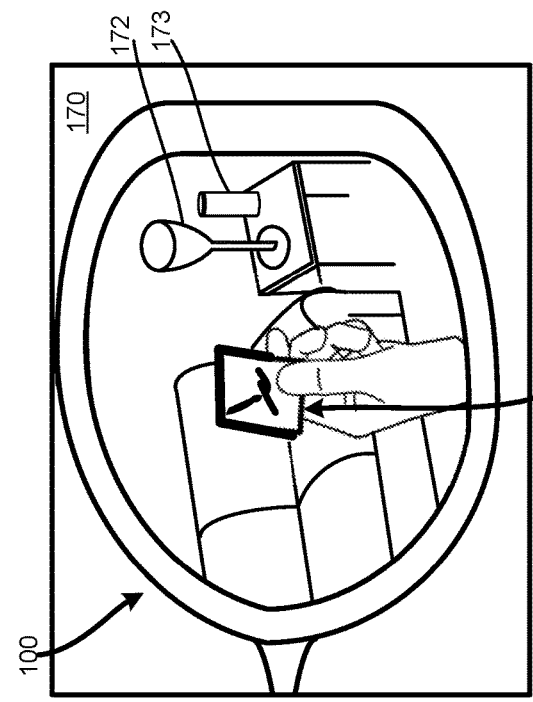
Figure 8D:
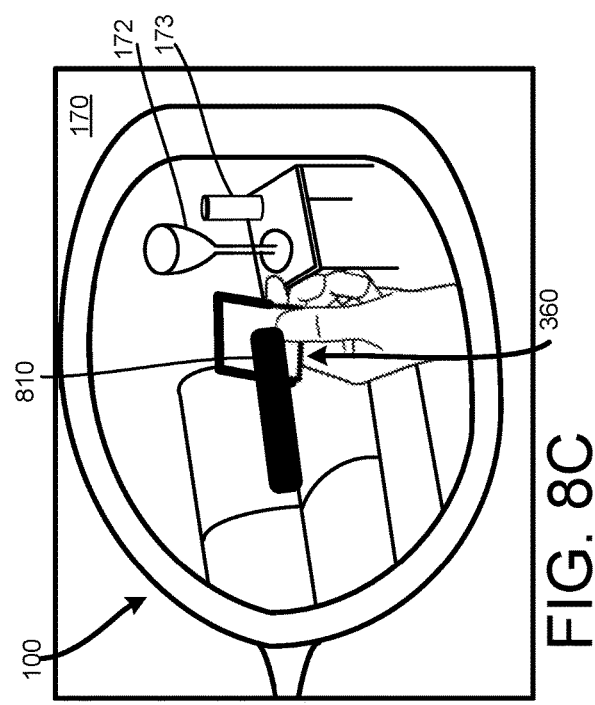

FIGS. 8A-8D illustrate another example in which a user interface is attached to the example pin 360. As shown in FIG. 8A, the user has picked up the pin 360 from the work surface 310, so that the pin 360 is in the field of view of the user/visible through the lens(es) of the HMD 100, and within the field of view of the camera of the HMD 100. The system may detect the pin within the field of view of the camera of the HMD 100, and may identify or recognize the pin 360 as described above. In some examples, the system may detect and identify features of the pin 360 for use in tracking the movement of the pin 360, and translating the detected movement into an action in the AR/MR/VR environment.

The user may issue a command to cause the pin 360 to serve as a user interface implement. In some examples, the command may be a verbal, or audible command that is detected by the audio sensors of the HMD 100 and processed by the transcription engine. In the example shown in FIG. 8B, the user has issued a command to use the pin 360 as a marking or drawing implement. In response to this command, the system generates annotations corresponding to detected movement of the pin 360. In the example shown in FIGS. 8B-8D, as movement of the pin 360 is detected, corresponding annotations 810 are made in the AR/MR/VR environment. Tracking of the pin 360, and in particular features of the pin 360, allow movement of the pin 360 to be tracked and corresponding annotation 810 to be displayed. This allows the pin 360 to function as a marking or drawing implement. The ready, opportunistic availability of the pin 360, and the ability to have the pin 360 function in this manner, provides the user with a tangible user interface for annotation in an AR/MR/VR environment.

The use of the pin 360 as a selection and control implement in the AR/MR/VR environment is provided by way of example in FIGS. 6A-8D. Other similar tangible objects available to the user in a similarly opportunistic manner may also be employed to provide similar functionality.

Figure 9A:
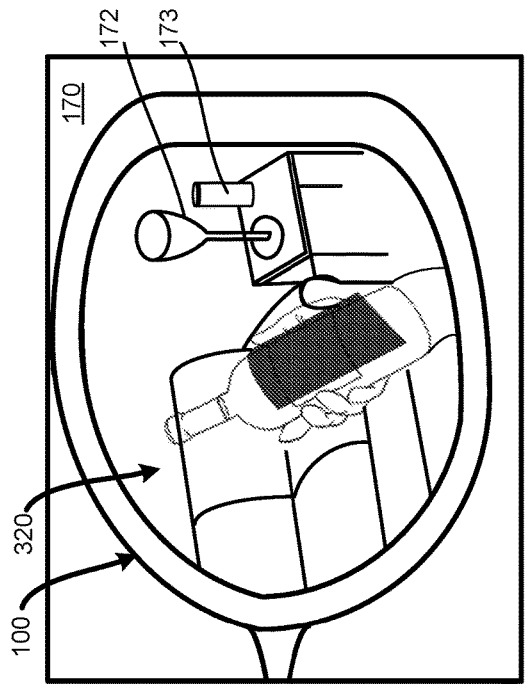
FIGS. 9A-9D illustrate an example system for use of physical objects in the ambient environment as mechanisms for user interfaces in an AR/MR/VR environment, in accordance with implementations described herein.
Figure 9B:
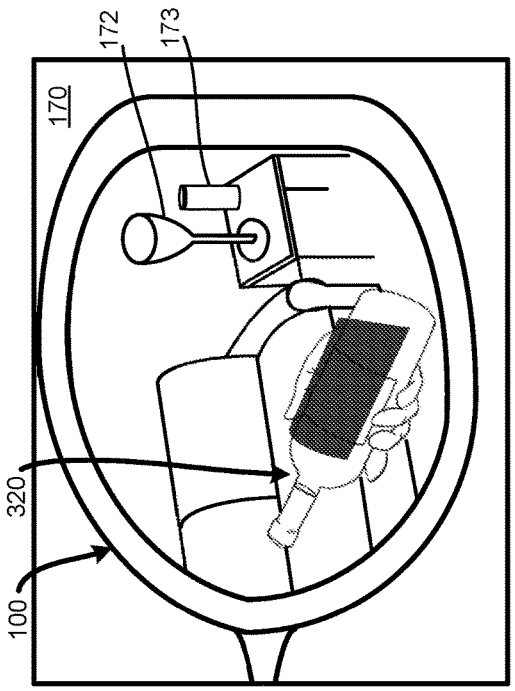
Figure 9C:
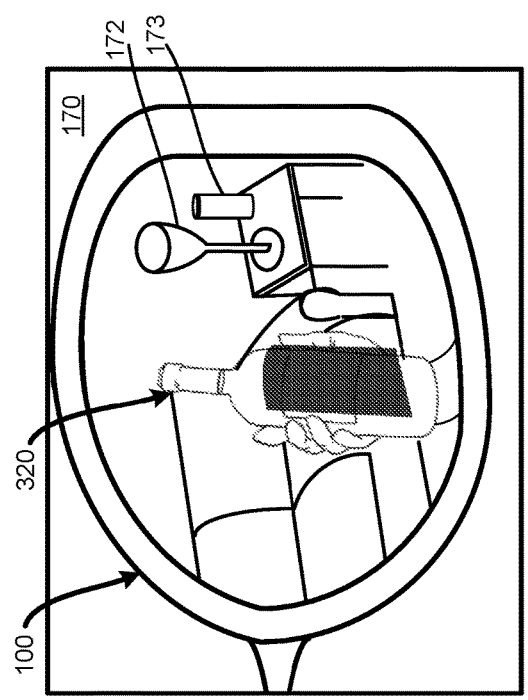
Figure 9D:
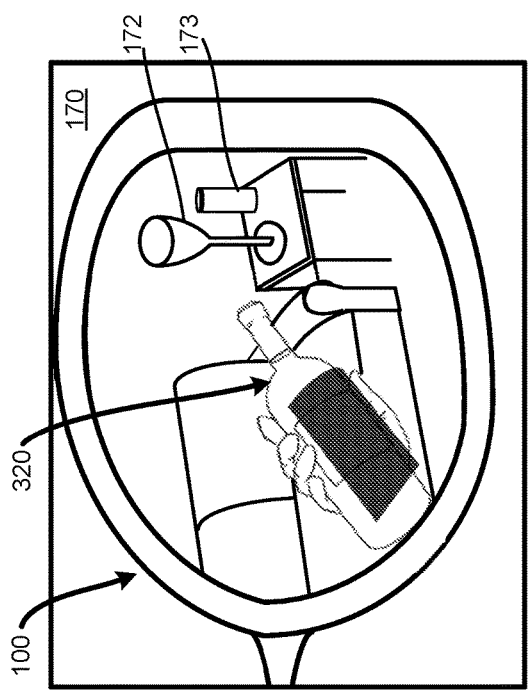

FIGS. 9A-9D illustrate an example in which the example bottle 320 is selected for use as an interface implement in the AR/MR/VR environment. As shown in FIG. 9A, the user has picked up the bottle 320 from the work surface 310, so that the bottle 320 is in the field of view of the user/visible through the lens(es) of the HMD 100, and within the field of view of the camera of the HMD 100. The system may detect the bottle 320 within the field of view of the camera of the HMD 100, and may identify or recognize the bottle 320 based on, for example, an external contour of the bottle 320, detected features in the images of the bottle 320 captured by the camera of the HMD 100 and previously stored images and/or information in the database, and the like. In some examples, this may be carried out by a recognition engine working in connection with information stored in the database(s) of the additional resources 210 available to the HMD 100. In some examples, the system may detect and identify features of the pin 360 for use in tracking the movement of the pin 360, and corresponding control of one of the connected/controllable devices in the ambient environment 170.

The user may issue a command to cause the bottle 320 to serve as a user interface implement. In some examples, the command may be a verbal, or audible command that is detected by the audio sensors of the HMD 100 and processed by the transcription engine. In the example shown in FIGS. 9B-9D, in response to a user command to use the bottle 320 as an interface implement, or a control implement such as a joystick in a game, movement of the bottle 320 may be tracked. The detected movement of the bottle 320 may be translated into actions in the AR/MR/VR environment, such as, for example, command and/or control inputs in a game, such that the bottle 320 functions as a control device for the game. In this manner, as the position and/or the orientation of the bottle 320 is changed, and the six-degree-of-freedom position of the bottle is detected and tracked, the bottle 320 may function as an input/control implement, and detected movements may be processed as inputs in the AR/MR/VR environment. The ready, opportunistic availability of the bottle 320, and the ability to have the bottle function in this manner, provides the user with a tangible control implement in an AR/MR/VR environment.

Figure 10A:
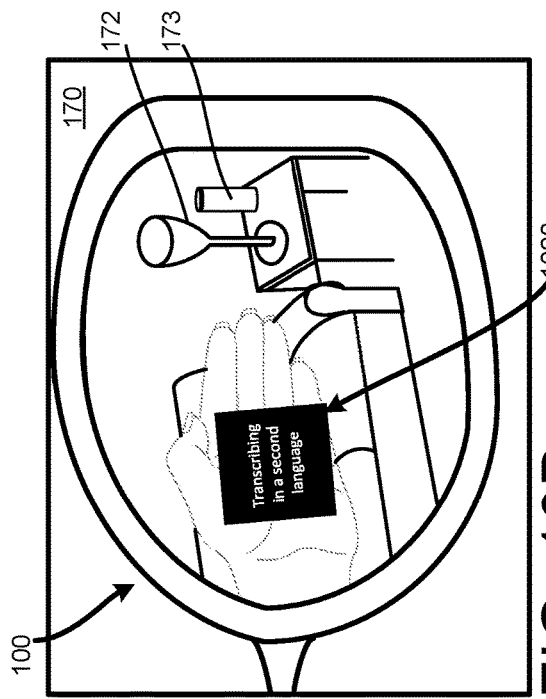
FIGS. 10A-10C illustrate an example system for use of physical objects in the ambient environment as mechanisms for user interfaces in an AR/MR/VR environment, in accordance with implementations described herein.
Figure 10B:
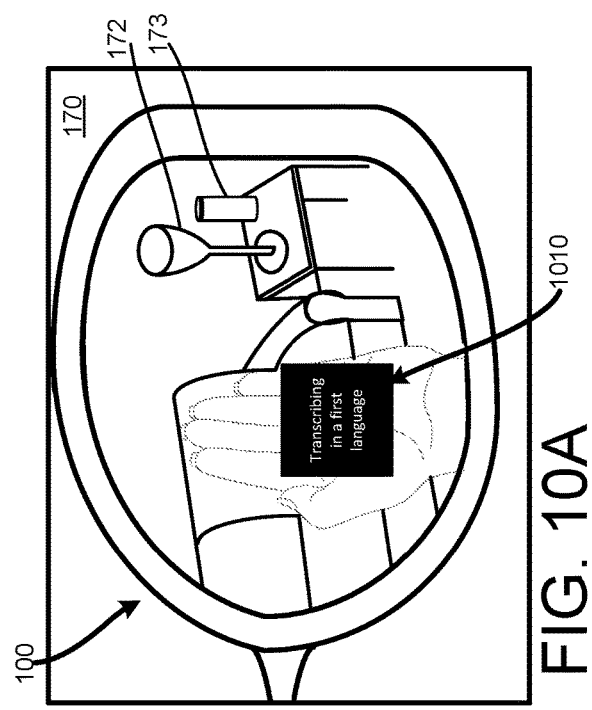
Figure 10C:
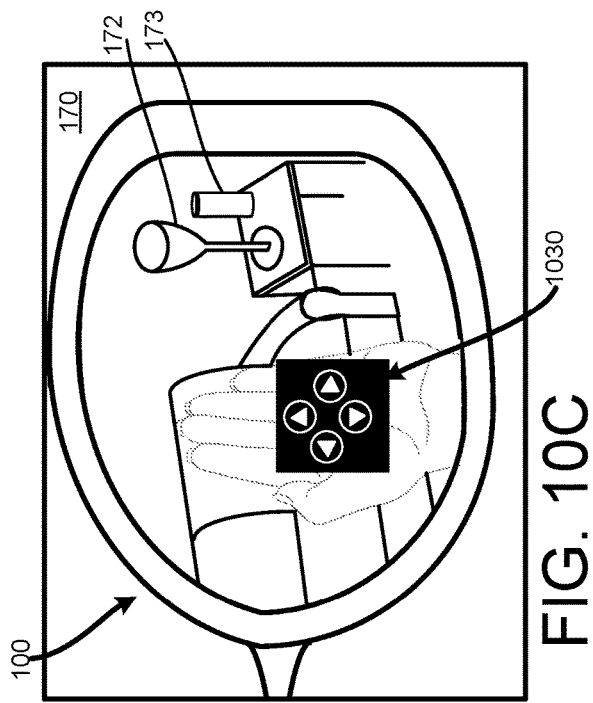

FIGS. 10A-10C illustrate an example in which the hand of the user serves as an interface implement in the AR/MR/VR environment. As shown in FIG. 10A, the user has positioned his/her hand in the field of view of the of the camera of the HMD 100. The system may detect the hand within the field of view of the camera of the HMD 100, and may identify or recognize the hand based on, for example, previously stored images and/or information in the database, and the like. In some examples, this may be carried out by a recognition engine working in connection with information stored in the database(s) of the additional resources 210 available to the HMD 100. In some examples, the system may detect and identify features of the hand for use in tracking the movement of the hand, to facilitate the placement of user interfaces, the tracking of the hand, and the like.

The user may issue a command to cause the hand to serve as a user interface implement. In some examples, the command may be a verbal, or audible command that is detected by the audio sensors of the HMD 100 and processed by the transcription engine. In the example shown in FIG. 10A, a first user interface 1010 has been output, or displayed on the palm of the user's hand in response to a first command to display the text of a transcription on the user interface device (i.e., the user's hand). In the example shown in FIG. 10B, rotation, or movement, or change in pose has triggered the generation of a second user interface 1020 to be output or displayed on the hand of the user. In this example, the change in pose of the hand of the user has triggered a translation of the transcription shown in the first user interface 1010. In FIG. 10C, a tap or touch input has triggered the output or display of a third user interface 1030 on the hand of the user, allowing the functionality of the hand of the user for the purposes of user interface and interaction to be remapped. The opportunistic availability of the hand of the user for use as an interface surface, and the ability to have the hand function in this manner, provides the user with a tangible interface and control implement in an AR/MR/VR environment.

Figure 11:
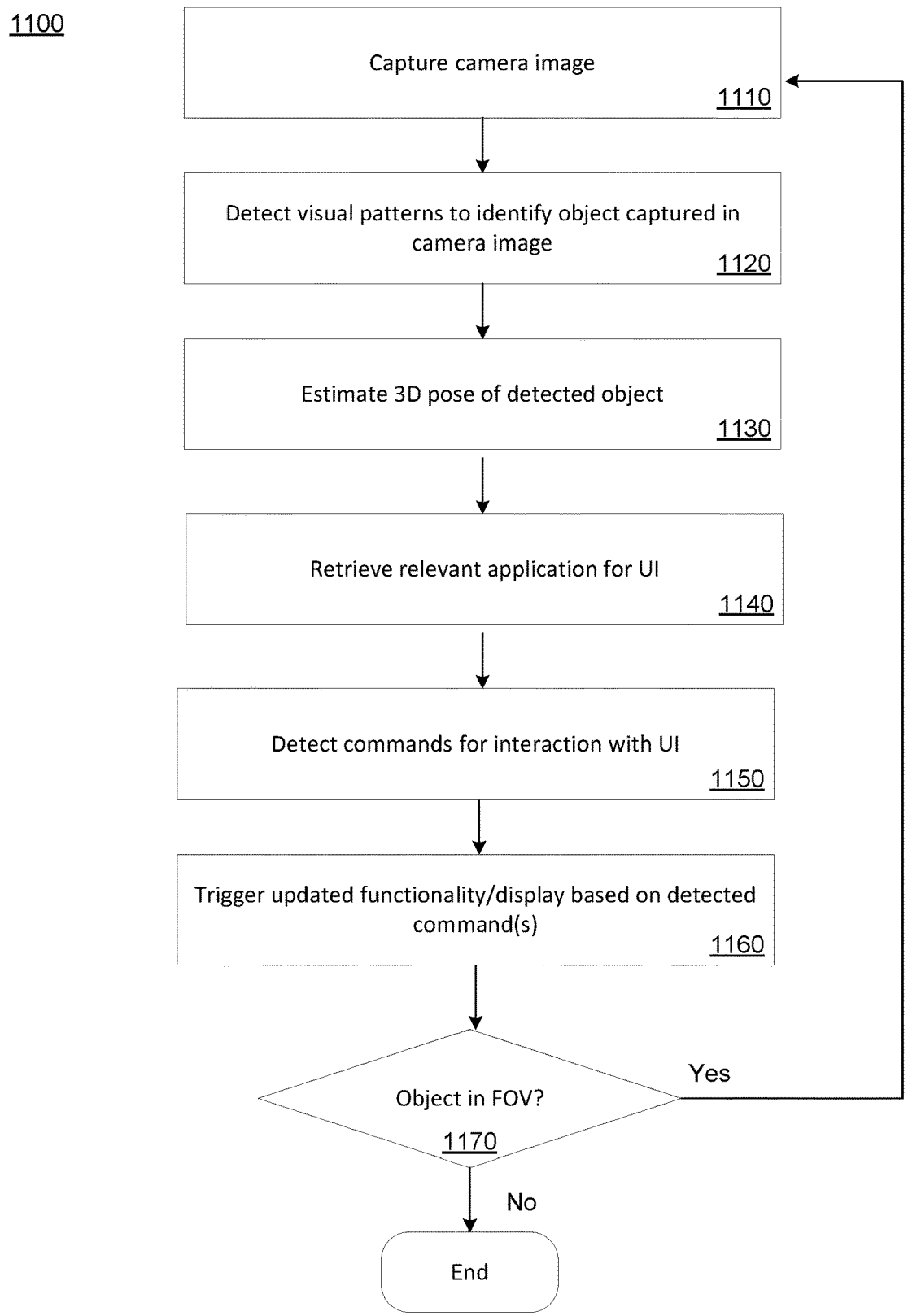
FIG. 11 is a flowchart of a method, in accordance with implementations described herein.

FIG. 11 is a flowchart of a method 1100, in accordance with implementations described herein. The method 1100 provides for the use of tangible, physical objects in the ambient environment as six-degree-of-freedom interface and control devices in an AR/MR/VR environment. An object to be implemented as an interface and/or control device may be captured within the field of view of a camera of a computing device (block 1110). Visual patterns, identifying features and the like may be identified in the image of the object captured by the camera of the computing device (block 1120). The detected visual patterns and/or identifying features may be compared to, or matched with, visual patterns and/or identifying features stored in a database accessible to the computing device. The object may be identified, and a three-dimensional pose of the object may be estimated, by comparing the detected visual patterns and identifying features detected in the image, as well as the information previously stored in the database, usage data and the like (block 1130). Relationship information may be retrieved, for example from the database accessible to the computing device (block 1140). The relationship information may be used to determine relevant applications related to the detected object, relevant user interfaces associated with the detected object, and the like. In response to detection of commands related to interaction with the user interface (block 1150), updated user interfaces, updated display information, updated functionality and the like may be generated and output (block 1160). The user commands may be, for example, verbal commands that are detected and transcribed by a transcription engine for processing, gesture inputs detected based on the six-degree-of-freedom tracking of the object, detected tap inputs with respect to the displayed user interface and six-degree-of-freedom tracking of the hand of the user, and the like. The process may continue until the object is no longer detected in the field of view of the camera of the computing device (block 1170).

Figure 12:
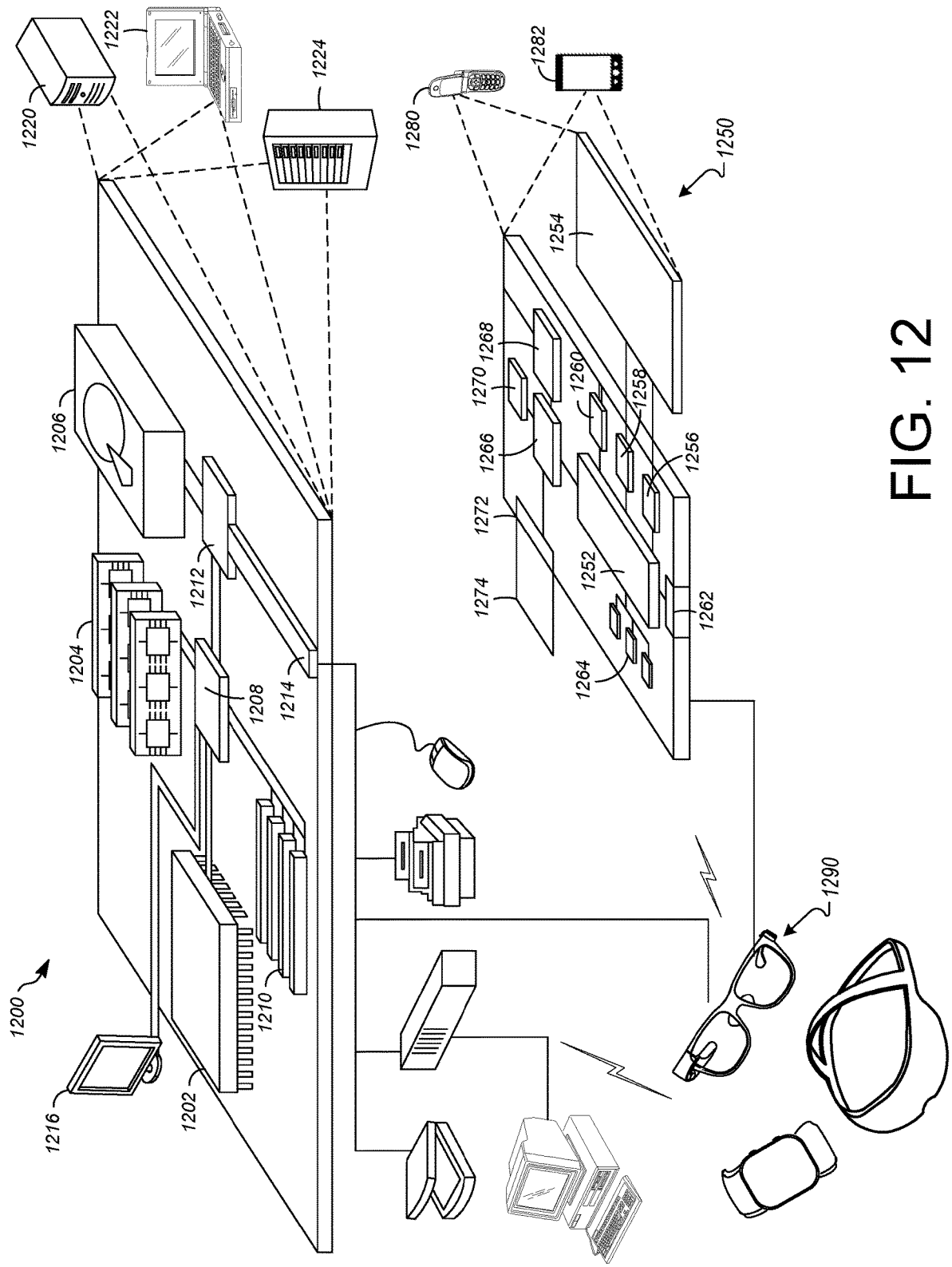
FIG. 12 illustrates an example of a computing device and a mobile computing device that can be used to implement the techniques described herein.

FIG. 12 illustrates an example of a computer device 1200 and a mobile computer device 1250, which may be used with the techniques described here. The computing device 1200 includes a processor 1202, memory 1204, a storage device 1206, a high-speed interface 1208 connecting to memory 1204 and high-speed expansion ports 1210, and a low-speed interface 1212 connecting to low-speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high-speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high-speed controller 1208 manages bandwidth-intensive operations for the computing device 1200, while the low-speed controller 1212 manages lower bandwidth-intensive operations. Such allocation of functions is example only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display), and LED (Light Emitting Diode) or an OLED (Organic Light Emitting Diode) display, or other appropriate display technology. The display interface 1256 may include appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In-Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 1290 to generate an augmented environment for viewing inserted content within the physical space. For example, one or more sensors included on a computing device 1250 or other computing device depicted in the figure, can provide input to the AR headset 1290 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1250 can use the sensors to determine an absolute position and/or a detected rotation of the computing device in the AR space that can then be used as input to the AR space. For example, the computing device 1250 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1250 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1250 when the computing device is incorporated into the AR space can cause a particular action to occur in the AR space.

In some implementations, a touchscreen of the computing device 1250 can be rendered as a touchpad in AR space. A user can interact with the touchscreen of the computing device 1250. The interactions are rendered, in AR headset 1290 for example, as movements on the rendered touchpad in the AR space. The rendered movements can control virtual objects in the AR space.

In some implementations, one or more output devices included on the computing device 1250 can provide output and/or feedback to a user of the AR headset 1290 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1250 may appear as another object in a computer-generated, 3D environment. Interactions by the user with the computing device 1250 (e.g., rotating, shaking, touching a touchscreen, swiping a finger across a touch screen) can be interpreted as interactions with the object in the AR space. In the example of the laser pointer in an AR space, the computing device 1250 appears as a virtual laser pointer in the computer-generated, 3D environment. As the user manipulates the computing device 1250, the user in the AR space sees movement of the laser pointer. The user receives feedback from interactions with the computing device 1250 in the AR environment on the computing device 1250 or on the AR headset 1290. The user's interactions with the computing device may be translated to interactions with a user interface generated in the AR environment for a controllable device.

In some implementations, a computing device 1250 may include a touchscreen. For example, a user can interact with the touchscreen to interact with a user interface for a controllable device. For example, the touchscreen may include user interface elements such as sliders that can control properties of the controllable device.

Computing device 1200 is intended to represent various forms of digital computers and devices, including, but not limited to laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
   capturing, by a camera of a computing device, image data associated with an ambient environment;
   identifying, in the image data, a physical object in the ambient environment;
   detecting an input to associate a virtual user interface with the physical object;
   designating the physical object as a physical user interface apparatus in response to the input;
   triggering display, by a display device of the computing device, of the virtual user interface as a virtual object overlaid on the physical object in the ambient environment;
   attaching the virtual object corresponding to the virtual user interface to the physical object;
   mapping at least one virtual feature of the virtual user interface to at least one physical feature of the physical object to enable coordinated movement of the virtual user interface with the physical object;
   detecting a physical manipulation of the physical object designated as the physical user interface apparatus;
   associating the physical manipulation of the physical object with a corresponding user interaction with the virtual user interface attached to the physical object; and
   in response to the physical manipulation of the physical object and the corresponding user interaction with the virtual user interface, triggering a change in a control algorithm associated with the virtual user interface corresponding to the physical manipulation of the physical object and the corresponding user interaction with the virtual user interface.

2. The computer-implemented method of claim 1, wherein triggering the change in the control algorithm of the virtual user interface includes controlling operation of an external electronic device in communication with the computing device in response to the physical manipulation of the physical object.

3. The computer-implemented method of claim 1, wherein triggering the change in the control algorithm of the virtual user interface includes changing a functionality of the virtual user interface in response to the physical manipulation of the physical object.

4. The computer-implemented method of claim 1, wherein triggering the change in the control algorithm of the virtual user interface includes:
   tracking, by a hand tracking module accessible to the computing device, hand movement in a field of view of the camera of the computing device;
   detecting, based on the tracking, a hand movement corresponding to an input into the virtual user interface; and
   executing an action in response to the input into the virtual user interface.

5. The computer-implemented method of claim 1, wherein triggering the change in the control algorithm of the virtual user interface includes:
   tracking, by a pose estimation module accessible to the computing device, a physical position and a physical orientation of the physical object;
   detecting, based on the tracking, a change in at least one of the physical position or the physical orientation of the physical object; and
   adjusting at least one of a virtual position or a virtual orientation of the virtual user interface in response to the change in the at least one of the physical position or the physical orientation of the physical object.

6. The computer-implemented method of claim 5, wherein detecting the input to associate the virtual user interface with the physical object includes:
   attaching the display of the virtual user interface to the physical object based on the mapping of the at least one physical feature of the physical object to the at least one virtual feature of the virtual user interface; and
   adjusting the virtual position and the virtual orientation of the virtual user interface in response to detected changes in the physical position and the physical orientation of the physical object such that the display of the virtual user interface remains attached to the physical object.

7. The computer-implemented method of claim 5, further comprising:
adjusting at least one of an appearance of the virtual user interface or a functionality of the virtual user interface based on a distance between the computing device and the physical object.

8. The computer-implemented method of claim 1, wherein detecting the input to associate the virtual user interface with the physical object includes:
detecting, by an audio sensor of the computing device, an audible input;
transcribing, by a transcription engine accessible to the computing device, the audible input into an executable command; and
associating the virtual user interface with the physical object in response to the executable command.

9. The computer-implemented method of claim 1, wherein identifying the physical object includes:
detecting visual patterns in the image data;
comparing the visual patterns detected in the image data to visual patterns associated with image data stored in a database accessible to the computing device; and
identifying the physical object based on the comparing.

10. The computer-implemented method of claim 1, wherein the computing device is a head mounted display device, and wherein capturing the image data and identifying the physical object includes:
capturing, by the camera mounted on a frame portion of the head mounted display device, the image data associated with the ambient environment; and
identifying, in the image data, the physical object held by a user within a field of view of the camera.

11. The computer-implemented method of claim 1, wherein detecting the physical manipulation of the physical object includes:
detecting a movement of the at least one physical feature of the physical object;
detecting a movement of the at least one virtual feature of the virtual user interface corresponding to the movement of the at least one physical feature of the physical object; and
triggering the change in the control algorithm of the virtual user interface, including executing an action in response to the physical manipulation of the physical object.

12. A computing system, comprising:
a head mounted computing device, including:
a camera capturing image data of an ambient environment;
a display device;
at least one processing device; and
a memory storing instructions that, when executed by the at least one processing device, cause the computing system to perform operations, including:
capturing, by the camera, image data of the ambient environment;
identifying, in the image data, a physical object in the ambient environment;
detecting an input to designate the physical object as a physical user interface apparatus;
triggering display, by the display device, of a virtual user interface as a virtual object overlaid on and attached to the physical object;
mapping at least one physical feature of the physical object to at least one virtual feature of the virtual user interface to enable coordinated movement of the virtual user interface and the physical object;
detecting a physical manipulation of the physical object designated as the physical user interface apparatus;
associating the physical manipulation of the physical object with a corresponding user interaction with the virtual user interface attached to the physical object; and
triggering a change in a control algorithm associated with the virtual user interface in response to the physical manipulation of the physical object and the corresponding user interaction with the virtual user interface.

13. The computing system of claim 12, wherein triggering the change in the control algorithm associated with the virtual user interface includes controlling operation of an external electronic device in communication with the head mounted computing device in response to the physical manipulation of the physical object.

14. The computing system of claim 12, wherein triggering the change in the control algorithm includes changing a functionality of the virtual user interface in response to the physical manipulation of the physical object.

15. The computing system of claim 12, wherein triggering the change in the control algorithm associated with the virtual user interface includes:
tracking, by a hand tracking module accessible to the head mounted computing device, hand movement in a field of view of the camera of the head mounted computing device;
detecting, based on the tracking, a hand movement corresponding to a user input into the virtual user interface; and
executing an action in response to the user input into the virtual user interface.

16. The computing system of claim 12, wherein triggering the change in the control algorithm associated with the virtual user interface includes:
tracking, by a pose estimation module accessible to the head mounted computing device, a physical position and a physical orientation of the physical object;
detecting, based on the tracking, a change in at least one of the physical position or the physical orientation of the physical object; and
adjusting at least one of a virtual position or a virtual orientation of the virtual user interface in response to the change in the at least one of the physical position or the physical orientation of the physical object.

17. The computing system of claim 12, wherein triggering the display of the virtual user interface as the virtual object overlaid on and attached to the physical object includes:
adjusting at least one of a virtual position or a virtual orientation of the virtual user interface in response to detected changes in a physical position or a physical orientation of the physical object such that the display of the virtual user interface remains attached to the physical object as the physical object moves in response to physical manipulation of the physical object.

18. The computing system of claim 12, wherein triggering the change in the control algorithm associated with the virtual user interface includes:
adjusting at least one of an appearance or a functionality of the virtual user interface based on a distance between the head mounted computing device and the physical object.

19. The computing system of claim 12, wherein detecting the input to designate the physical object as the physical user interface apparatus includes:
- detecting, by an audio sensor of the head mounted computing device, an audible command;
- transcribing, by a transcription engine accessible to the head mounted computing device, the audible command into an executable command; and
- designating the physical object as the physical user interface apparatus in response to the executable command.

20. The computing system of claim 12, wherein detecting the physical manipulation of the physical object includes:
- detecting a movement of the at least one physical feature of the physical object;
- detecting a movement of the at least one virtual feature of the virtual user interface corresponding to the movement of the at least one physical feature of the physical object; and
- triggering the change in the control algorithm of the virtual user interface, including executing an action in response to the physical manipulation of the physical object.

\* \* \* \* \*